US006871021B2

(12) United States Patent
Graves et al.

(10) Patent No.: US 6,871,021 B2
(45) Date of Patent: Mar. 22, 2005

(54) OPTICAL SWITCH WITH CONNECTION VERIFICATION

(75) Inventors: Alan F. Graves, Kanata (CA); John G. Gruber, Orleans (CA); Andrew J. Bryant, Bishop's Stortford (GB)

(73) Assignee: Nortl Networks Limited, St-Laurent (CA)

( * ) Notice: Subject to any disclaimer, the term of this patent is extended or adjusted under 35 U.S.C. 154(b) by 645 days.

(21) Appl. No.: 09/859,544

(22) Filed: May 18, 2001

(65) Prior Publication Data

US 2002/0012143 A1 Jan. 31, 2002

Related U.S. Application Data

(60) Provisional application No. 60/207,292, filed on May 30, 2000.

(51) Int. Cl.[7] .......................... H04B 10/08; H04J 14/00
(52) U.S. Cl. ........................... 398/45; 398/49; 398/50; 398/51; 398/54; 398/57; 398/56; 398/16; 398/33
(58) Field of Search .................. 398/16, 12, 19, 398/30, 32, 33, 45, 50, 51, 55, 56, 57

(56) References Cited

U.S. PATENT DOCUMENTS

| 5,296,956 | A | * | 3/1994 | Fatehi et al. ................. 398/33 |
| 5,867,289 | A | * | 2/1999 | Gerstel et al. ................. 398/12 |
| 5,956,165 | A | | 9/1999 | Fee et al. |
| 6,529,301 | B1 | * | 3/2003 | Wang ........................... 398/82 |
| 6,647,208 | B1 | * | 11/2003 | Kirby ........................... 398/45 |

FOREIGN PATENT DOCUMENTS

EP        1 081 982 A2       3/2001

OTHER PUBLICATIONS

Kong E et al. : "Pilot–tone based optical path supervisory scheme for opticcal cross–connects" Electronics Letters, IEE Stevenage, GB, vol. 35, No. 17. Aug. 19, 1999, pp. 1481–1483.*

Chu Kwang–Uk et al: "Scalable optical–path supervisory scheme using pilot tones and channel equalisers" Electronics Letters, IEE Stevenage, GB, vol. 36, No. 9, Apr. 27, 2000, pp. 817–818, XP006015153 ISSN: 0013–5194.

Zhong S et al: "Optical Path and Crosstalk Monitoring for Optical Cross Connect Switches Using Arrayed Waveguide Grating" Optical Fiber Communication Conference. (OFC). Technical Digest Postconferene Edition. Baltimore, MD, Mar. 7–10, 2000, New York,NY: IEEE, US, vol. 2 of 4, Mar. 7, 2000, pp. WK5–1–WK5–3, XP001017499 ISBN: 0–7803–5952–6.

Kong E et al: "Pilot–tone based optical–path supervisory scheme for optical cross–connects" Electronics Letters, IEE Stevenage, GB, vol. 35, No. 17, Aug. 19, 1999, pp. 1481–1483, XP006012591 ISSN: 0013–5194.

European Search Report EP 01 30 4669; Jul. 4, 2003.

* cited by examiner

*Primary Examiner*—M. R. Sedighian

(57) ABSTRACT

An optical switch is equipped with a set of optical intensity controllers at its input, each intensity controller being driven to vary a corresponding WDM input traffic signal with a low power test signal. The switch is also equipped with optical splitters at its output and a path integrity analyzer connected to the splitters and to the intensity controllers. The path integrity analyzer generates or controls generation of the test signals applied by the intensity controllers. The path integrity analyzer also receives the tapped portions of the WDM output signals and separates them into their single-carrier components in order to recover a set of switched single-carrier optical signals. The path integrity analyzer is further provided with test signal detectors used to detect the presence of a test signal in each recovered switched single-carrier optical signal. The path integrity analyzer thus ascertains the integrity of the connection involving each switched single-carrier optical signal by comparing detected test signals to expected test signals that are derived from a connection map.

33 Claims, 13 Drawing Sheets

| COMPONENT<br>EMBODIMENT | # M-OUTPUT WDD's | # M-INPUT WDM's | MEMS | SIZE OF MEMS | # OPTICAL RECEIVERS | # TUNABLE OPTICAL FILTERS | # TEST SIGNAL DETECTORS | COARSE DETECTION CYCLE TIME DUE TO SETTLING (x TSETTLE) |
|---|---|---|---|---|---|---|---|---|
| FIG. 5A | N | 0 | 0 | - | M×(N+K) | 0 | M×(N+K) | 0 (AFTER INITIAL SETTLING TIME) |
| FIG. 5B | 1 | K | 1 | N+K | M | 0 | M | N+K |
| FIG. 5C | 1 | K | H+1 | $\frac{M}{H}$ | H | 0 | H | $\frac{M \times (N+K)}{H}$ |
| FIG. 5D | 0 | K | 0 | - | N+K | N+K | N+K | M |
| FIG. 5E | 0 | K | 1 | N+K | 1 | 1 | 1 | M×(N+K) |

FIG. 7A $M = 40, N = 24, K = 8, T_{SETTLE} = 10ms, H = 4$

| COMPONENT<br>EMBODIMENT | # M-OUTPUT WDD's | #M-INPUT WDM's | # MEMS | # OPTICAL RECEIVERS | # TUNABLE OPTICAL FILTERS | # TEST SIGNAL DETECTORS | COARSE DETECTION CYCLE TIME DUE TO SETTLING | TOTAL COMPONENT COUNT |
|---|---|---|---|---|---|---|---|---|
| FIG. 5A | 32 | 0 | 0 | 1024 | 0 | 5120 | 0 SECONDS | 2080 |
| FIG. 5B | 1 | 8 | 1(32x1) | 40 | 0 | 128 | 0.32 SECONDS | 83 |
| FIG. 5C | 1 | 8 | 1(32x1)<br>4(10x1) | 4 | 0 | 4 | 3.2 SECONDS | 22 |
| FIG. 5D | 0 | 8 | 0 | 32 | 32 | 40 | 0.4 SECONDS | 104 |
| FIG. 5E | 0 | 8 | 1 | 1 | 1 | 1 | 12.8 SECONDS | 12 |

FIG. 7B

OPTICAL SWITCH WITH CONNECTION VERIFICATION

CROSS-REFERENCES TO RELATED APPLICATIONS

This application claims the benefit of U.S. Provisional Application No. 60/207,292, filed May 30, 2000.

FIELD OF THE INVENTION

The present invention relates generally to communications networks employing wavelength division multiplexed optical signals and, more particularly, to methods and systems for enabling the verification of individual switch connections established by large optical switches used in such networks.

BACKGROUND OF THE INVENTION

Typically, fiber-optic based telecommunications networks employ optical switches to switch signals arriving along a number of optical fibers. FIG. 1 shows an example of an optical switch 100, adapted to receive a plurality of wavelength division multiplexed (WDM) input signals $S_{IN,A}$ ... $S_{IN,N}$ on a respective plurality of input optical fibers 110A ... 110N and adapted to output a corresponding set of WDM output signals $S_{OUT,A}$ ... $S_{OUT,N}$ on a respective plurality of output optical fibers 120A ... 120N. Each of the WDM input signals and WDM output signals may carry up to M single-carrier optical signals. Thus, viewed from outside the switch 100, there is provided switching for M×N single-carrier optical signals.

Inside the optical switch 100 there is provided a plurality of wavelength division demultiplexing (WDD) devices $130_A$ ... $130_N$ for splitting up respective ones of the WDM input signals $S_{IN,A}$ ... $S_{IN,N}$ into their single-carrier components. At the output end of the optical switch 100, there is provided a plurality of wavelength division multiplexing (WDM) devices 140A ... 140N for recombining respective sets of single-carrier optical signals into the WDM output signals $S_{OUT,A}$ ... $S_{OUT,N}$, respectively.

Disposed between the WDD devices 130A ... 130N and the WDM devices 140A ... 140N is a switching core 150, which provides switching functionality for the array of single-carrier optical signals arriving from the WDD devices 130A ... 130N. The switching core 150 is responsive to a connection map provided by a switch controller 160 which interfaces with network components that are external to the optical switch 100.

The switching activity performed by the switching core 150 may occur in the electrical domain (with the aid of opto-electronic converters) or in the optical domain or in a combination of the two. As the number of single-carrier optical signals required to be switched by the optical switch 100 grows beyond several hundred, it becomes increasingly efficient to perform at least part of the switching core's functionality purely in the optical domain. Such optical switches are known as photonic switches.

An example of a photonic switch is shown in FIG. 2 and is described more fully in the U.S. patent application Ser. No. 09/511,065 to Graves et al., entitled "Switch for Optical Signals", filed on Feb. 23, 2000, assigned to the assignee of the present invention and hereby incorporated by reference herein. The switching core 250 of the photonic switch 200 provides controllable switching of the single-carrier optical signals received from the WDD devices 130A ... 130N. In the illustrated embodiment, the switching core 250 comprises M optical switch matrices 210A ... 210M, one for each of the M optical wavelengths in the system, as well as a wavelength converting switch 220.

Each of the optical switch matrices 210A ... 210M has a fixed number of input ports and output ports and can (but need not) be a Micro-Electro-Mechanical System (MEMS) device similar in concept to, or as described in "Free-Space Micromachined Optical-Switching Technologies and Architectures" by Lih Y. Lin of AT&T Labs-Research during OFC99 Session W14-1 on Feb. 24, 1999. This article is incorporated by reference herein.

As described in the above-referenced article, a MEMS device comprises a set of mirrors that are arranged in geometrical relationship with the input and output ports in such a way that incoming light from any input port can be diverted to any output port by raising an appropriate one of the mirrors. The raising and lowering of mirrors is performed under control of the switch controller 160.

In fact, each of the optical switch matrices 210A ... 210M has a total of K+N input ports and K+N output ports where N is the number of WDM input signals and WDM output signals. For each of the optical switch matrices 210A ... 210M, each of the N input ports is connected to the like-wavelength output port of a respective one of the WDD devices 130A ... 130N, while the remaining K input ports are connected to the wavelength converting switch 220.

The signals exiting the optical switch matrices 210A ... 210M through the output ports thereof can be referred to as "switched" single-carrier optical signals and are shown at 260 in FIG. 2. Among the N+K switched single-carrier optical signals exiting a particular one of the switching matrices 210A ... 210M, N of these are fed to like-wavelength input ports of the WDM devices 140A ... 140N, while the remaining K signals are fed to the wavelength converting switch 220.

The wavelength converting switch 220 thus receives and outputs M×K single-carrier optical signals. In order to provide the required wavelength conversion functionality, the wavelength converting switch 220 is equipped with circuitry for converting the received single-carrier optical signals into electronic form, electrically switching the electronic signals and then modulating each switched electronic signal in accordance with an optical source at a desired wavelength. Wavelength conversion is particularly useful when an input wavelength is already in use along the fiber path leading to a destination WDM device. It is also useful as a regeneration function when the optical signal has accumulated too many impairments for onward direct optical propagation.

The arrangement of FIG. 2 permits optical signals of a given wavelength entering any particular optical switch matrix (associated with a particular wavelength) to be connected in a non-blocking fashion to any like-wavelength input port on any of the WDM devices 140A ... 140N. Moreover, provided sufficient switching capacity is provided in the wavelength converting switch 220, the wavelength of a number of single-carrier optical signals can be changed so that each of these signals may appear on any input port of any of the WDM devices 140A ... 140N.

Since wavelength conversion is a relatively expensive process, a trade-off exists between the level of wavelength flexibility available at the switch 200 and the cost of the switch. Fortunately, with network-level control of the wavelengths used by the various optical sources in the network, it is usually possible to ensure that most wavelengths can transit directly across most nodes in the network without requiring wavelength conversion. This is particularly true in a network having a mesh topology, which is becoming the favoured topology for new networks. Thus, even for a relatively small value for K, it is usually possible to achieve a minimal blocking probability at the switch 200.

It is also noted that the wavelength converting switch 220 may accept a plurality of add carriers on a plurality (R) of "add" paths 270 and similarly may output a plurality of drop carriers on a plurality (R) of "drop" paths 280. For simplicity, the term "wavelength converting switch" will be used throughout the following, with the understanding that a "wavelength converting switch" may have either wavelength conversion capabilities or add/drop capabilities or both.

The switch controller 160 generates a connection map under external or locally generated stimulus and provides this connection map to the components of the switching core 250. Specifically, each optical switch matrix executes a respective (N+K)×(N+K) mapping in the optical domain and the wavelength converting switch 220 executes an (M×K)×(M×K) mapping in the electrical domain.

The photonic switch described in part herein above and described in more detail in U.S. patent application Ser. No. 09/511,065 is an example of how developments in the field of optical switching are often stimulated by the need to accommodate the ever increasing optical wavelength density of WDM networks in general and WDM signals in particular.

Another consequence of the increasing density of emerging high-capacity WDM systems is an increased probability with which the switching of single-carrier optical signals within the optical switch 100 can be made erroneously or, in some cases, not made at all. Some of the myriad causes of mis-connections and lost connections include stuck or failed switch elements in the switching core 150, hardware or software failures causing incorrect switch path instructions to be received by the switching core 150 from the switch controller 160, human error (e.g., a mis-connected fiber interconnect into or between bays of switching equipment), etc.

Given the high line rates currently used in WDM networks and the even higher line rates contemplated for use in the foreseeable future, it is clear that erroneous or lost connections can and will have a very severe negative impact on quality of service by causing the loss of large amounts of data. It is therefore of prime importance to verify the integrity of connections established by the switching core 150 in order to ensure that these indeed correspond to the connections specified by the connection map stored in the switch controller 160.

SUMMARY OF THE INVENTION

The present invention is directed to enabling connection verification in an optical switch that has a switching core that performs at least part of its switching directly in the optical domain in response to a connection map. To this end, the switch is equipped with a set of optical intensity controllers at its input, where one intensity controller is associated with each input optical fiber. Each of the intensity controllers is controllably driven to vary a corresponding WDM input traffic signal with a low power test signal. The switch is also equipped with optical splitters at its output in order to recover a portion of the power of each WDM output signal, which can then be optically demultiplexed, thus affording visibility into the set of single-carrier optical signals which exit the switching core. If, in addition to purely optical switching, wavelength conversion is provided within the switching core, then additional optical splitters may be provided at the input to the wavelength conversion unit, thereby to provide full visibility of all of the single-carrier optical signals being switched by the switching core.

The switch is further equipped with a path integrity analyzer connected to the splitters and to the intensity controllers. The path integrity analyzer generates or controls generation of the test signals applied by the intensity controllers. The path integrity analyzer also receives the tapped portions of the WDM output signals and separates them into their single-carrier components in order to recover the set of switched single-carrier optical signals. The path integrity analyzer is further provided with test signal detectors used to detect the presence of a test signal in each recovered switched single-carrier optical signal.

The path integrity analyzer can thus ascertain the integrity of the connection involving each switched single-carrier optical signal by comparing the detected test signal to an expected test signal that is derived from the connection map. In other words, since the path integrity analyzer has knowledge of the test signals and the WDM input signals to which the test signals are being applied, and since the path integrity analyzer also has knowledge of the connection map which is supposed to be applied by the switching core, the path integrity analyzer can determine which test signal, if any, is supposed to appear in each of the given switched single-carrier optical signal.

Thus, the invention may be summarized according to a first broad aspect as a switch for optical signals, including a plurality of wavelength division demultiplexers, each having an input port and a plurality of output ports; a plurality of wavelength division multiplexers, each having an output port and a plurality of input ports; an optical switching core having a plurality of input ports and a plurality of output ports, at least some of the input ports of the optical switching core being connected to the output ports of the wavelength division demultiplexers and at least some of the output ports of the optical switching core being connected to the input ports of the wavelength division multiplexers, the optical switching core being capable of establishing wavelength-preserving connections between its input ports and its output ports in response to receipt of a connection map; a plurality of optical intensity controllers, each being adapted to vary the intensity of an input wavelength division multiplexed optical signal entering the input port of a corresponding one of the wavelength division demultiplexers; a plurality of optical splitters, each being adapted to tap a fraction of the optical power of an output wavelength division multiplexed optical signal exiting the output port of a corresponding one of the wavelength division multiplexers; and a connection verification unit connected to the optical intensity controllers and to the splitters.

The connection verification unit is operable to control the optical intensity controllers so as to cause the application of a test signal to each input wavelength division multiplexed optical signal. The connection verification unit is further operable to process the output wavelength division multiplexed optical signals tapped by the splitters in order to determine which test signal, if any, appears in each of the signals exiting the at least some of the output ports of the optical switching core. Finally, the connection verification unit is operable to determine whether the wavelength-preserving connections involving the signals entering the at least some of the input ports and the signals exiting the at least some of the output ports of the optical switching core have been established in accordance with the connection map.

The invention may also be summarized as a connection verification system including the above-mentioned optical intensity controllers, optical splitters and connection verification unit.

According to another broad aspect, the invention may be summarized as a method of validating the switch connections established by the switching core, including: varying a property of each first wavelength division multiplexed optical signal in accordance with a corresponding test signal; tapping and optically demultiplexing the second wavelength division multiplexed signals, thereby to access the at least some of the wavelength division multiplexed optical signals present at the second ports of the switching core, such signals being called "switched optical signals"; for each switched optical signal, determining which, if any, test signal appears in that switched optical signal; and for each switched optical signal, comparing the test signal found to be present in that switched optical signal to an expected test signal corresponding to that switched optical signal.

The invention may be summarized according to a further broad aspect as a path integrity analyzer for use in verifying the integrity of connections made by an optical switch, including: a controller for controlling the application of test signals to the first wavelength division multiplexed optical signals; a wavelength separation stage for demultiplexing the second wavelength division multiplexed optical signals into component signals, thereby to access the at least some of the optical signals present at the second ports of the switching core, such signals being called "switched optical signals"; a detection stage for determining which test signal, if any, appears in each switched optical signal; and the controller being further adapted to compare, for each switched optical signal, the test signal found to be present in that switched optical signal to an expected test signal corresponding to that switched optical signal.

A plurality of optical splitters may be provided for tapping those switched optical signals travelling from output ports of the optical switching core to input ports of the wavelength conversion unit. The control unit may further be operable to determine whether the wavelength-preserving connections involving the signals entering the at least some of the input ports of the optical switching core and the signals exiting those output ports of the optical switching core that are connected to the wavelength conversion unit have been established in accordance with the connection map.

A plurality of optical intensity controllers may also be positioned so that they vary the intensity of the optical signal entering a corresponding one of the input ports of the optical switching core that are connected to the wavelength conversion unit. The control unit may further be operable to determine whether the wavelength-preserving connections involving the optical signals entering those input ports of the optical switching core that are connected to the wavelength conversion unit and the signals exiting the at least some of the output ports of the optical switching core have been established in accordance with the connection map.

There may also be provided a mechansim constructed and adapted to remove the test signals from the signals exiting the output ports of the optical switching core prior to recombination at the wavelength division multiplexing devices.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the drawings:

FIG. 7A is a table showing the number of different kinds of components required and the detection cycle time as a function of M, N and K generally;

FIG. 7B is a table showing the number of different kinds of components required as well as the total component count and the detection cycle time as a function of specific values of M, N and K.

DETAILED DESCRIPTION OF THE PREFERRED EMBODIMENTS

The present invention is directed to providing connection verification for a photonic switch, i.e., an optical switch that is capable of making direct optical connections without requiring wavelength conversion. As has been mentioned in the background section, an increase in the number of WDM input/output signals and the number of wavelengths per signal leads to a greater probability that one or more switch connections will be incorrectly established or will not be made at all. From this stems the importance of providing the ability to verify the switch connections.

Figure 1:
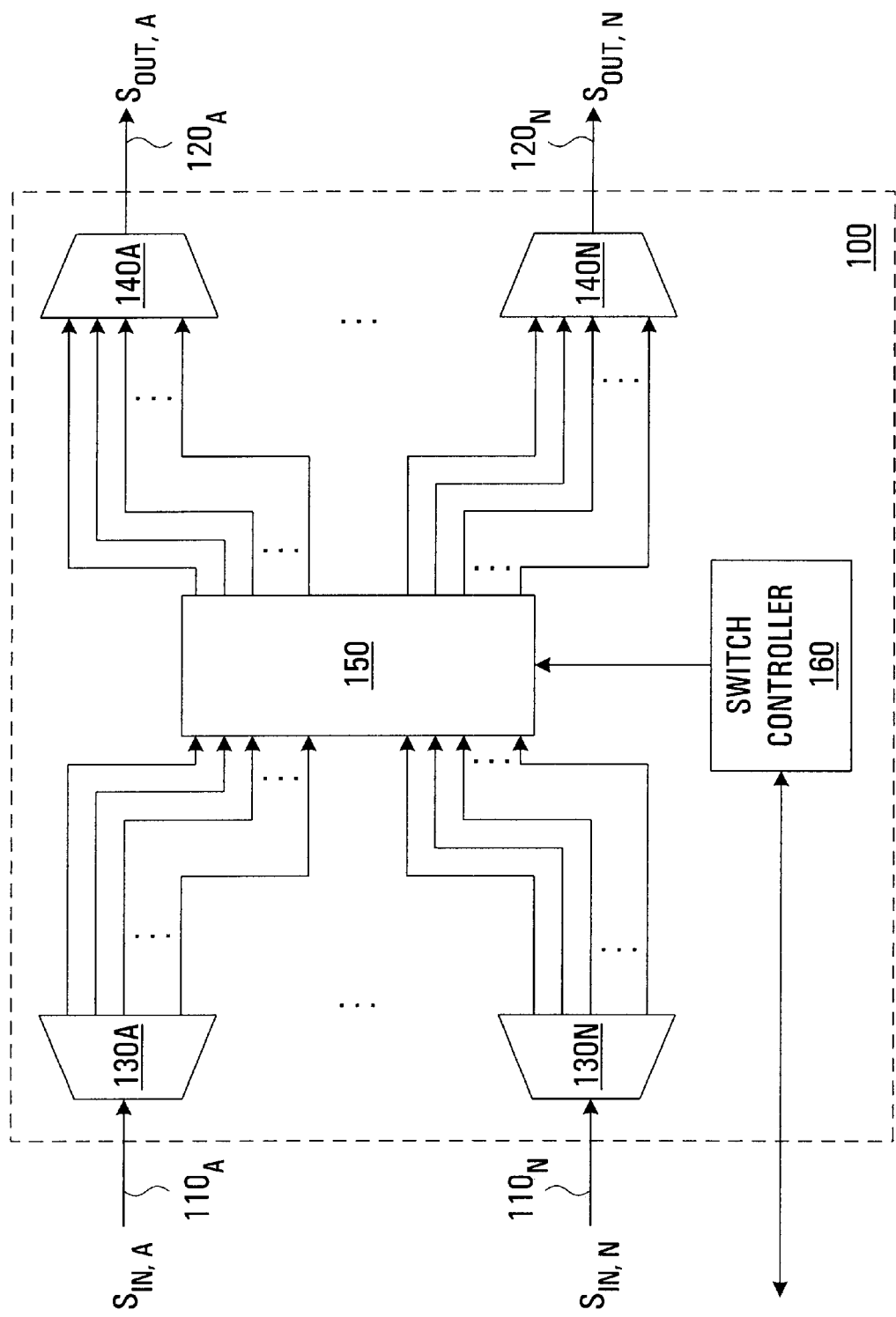
FIG. 1 shows in block diagram form a generic switch for optical signals.
Figure 2:
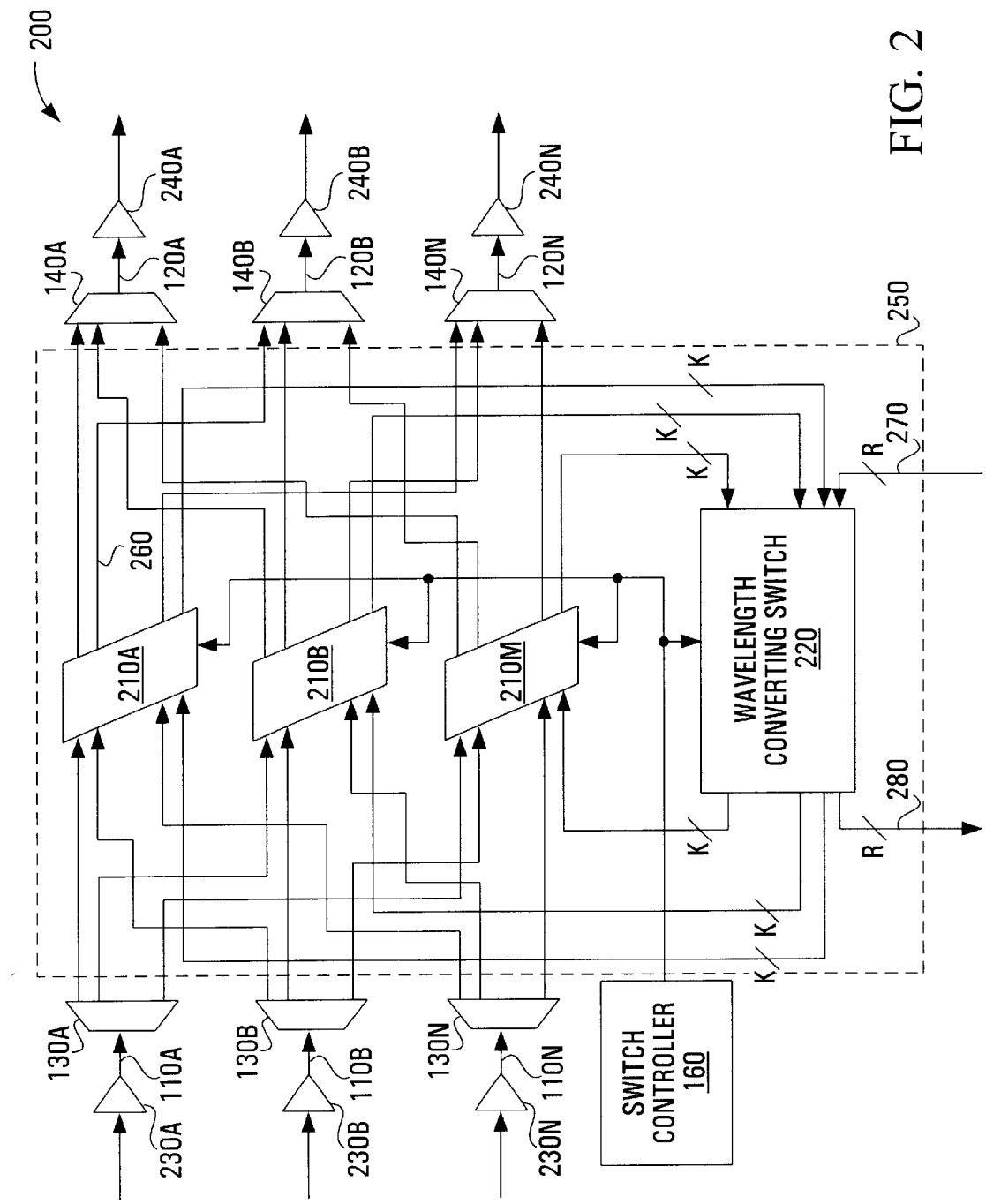
FIG. 2 shows in block diagram form a photonic switching core and an associated electrical fabric with wavelength conversion and add/drop functionality.
Figure 3:
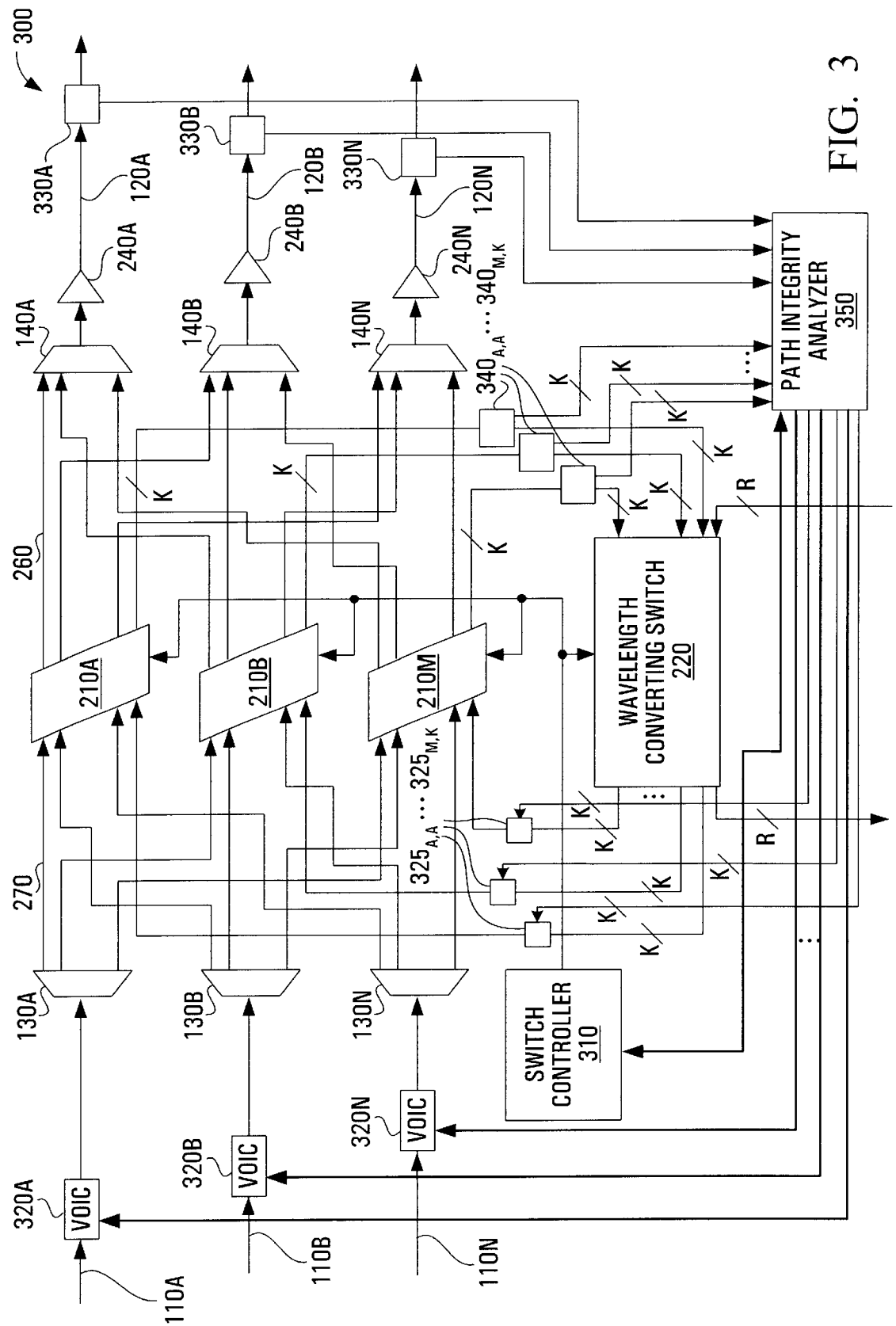
FIG. 3 shows in block diagram form a photonic switch equipped with connection verification functionality in accordance with an embodiment of the present invention.

FIG. 3 shows an embodiment of a photonic switch 300 equipped with connection verification functionality. The switch 300 in FIG. 3 is based on the switch 200 in FIG. 2 and thus retains the WDD devices 130A . . . 130N, the WDM devices 140A . . . 140N and the switching core including the optical switch matrices 210A . . . 210M and the wavelength converting switch 220. The components of the switch 200 which have been retained in the switch 300 could be exactly as described in the background section or they could be any functional or structural equivalents or improvements thereupon.

The present invention enables verification of the connections made by each of the M optical switch matrices 210A . . . 210M. This includes "type 1" connections (between the WDD devices 130A . . . 130N and the WDM devices 140A . . . 140N), "type 2" connections (between the WDD devices 130A . . . 130N and the wavelength converting switch 220) and "type 3" connections (between the wavelength converting switch 220 and the WDM devices 140A . . . 140N).

In accordance with an embodiment of the invention, the switch 300 is equipped with a set of N optical intensity controllers 320A . . . 320N, a set of M×K optical intensity controllers $325_{A,A} \ldots 325_{M,K}$, a set of N asymmetric optical splitters 330A . . . 330N, a set of M×K asymmetric optical splitters $340_{A,A} \ldots 340_{M,K}$ and a path integrity analyzer 350. A modified switch controller 310 is also provided.

The optical intensity controllers 320A . . . 320N and the optical splitters 330A . . . 330N are together used for verifying "type 1" connections (i.e., those between the WDD devices 130A . . . 130N and the WDM devices 140A . . . 140N), while the optical intensity controllers 320A . . . 320N and the optical splitters $340_{A,A} \ldots 340_{M,K}$ are together used for verifying "type 2" connections (i.e., those between the WDD devices 130A . . . 130N and the wavelength converting switch 220). Finally, the optical intensity controllers $325_{A,A} \ldots 325_{M,K}$ and the optical splitters 330A . . . 330N are together used for verifying "type 3" connections (i.e., those between the wavelength converting switch 220 and the WDM devices 140A . . . 140N).

It should be appreciated that it is not necessary to provide the capability to verify all of "type 1", "type 2" and "type 3" connections. Rather, it is also within the scope of the invention to provide the necessary hardware and software to verify only "type 1" connections, only "type 2" connections or only "type 3" connections or any combination thereof.

The N optical intensity controllers 320A . . . 320N are respectively placed in the optical paths of the WDM input signals travelling along the input optical fibers 110A . . . 110N. The M×K optical intensity controllers $325_{A,A} \ldots 325_{M,K}$, are respectively placed in the optical paths of the single-carrier optical signals travelling between the wavelength converting switch 220 and the optical switch matrices 210A . . . 210M.

Each optical intensity controller can be of standard design and includes circuitry and control logic for varying the intensity of the corresponding optical signal in accordance with a test signal received from the path integrity analyzer 350.

A particular test signal will have a property that uniquely identifies the optical signal with which it is associated. For example, each of the WDM input signals on the input optical fibers 110A . . . 110N is associated with a unique test signal. Thus, each WDM input signal is "tagged" by its own test signal and the combination of test signal and wavelength uniquely identifies each input single-carrier optical signal. Similarly, each of the M×K single-carrier optical signals travelling between the wavelength converting switch 220 and the optical switch matrices 210A . . . 210M is tagged by its own test signal.

In some embodiments, the test signals may be constant-amplitude carriers at unique frequencies. In other embodiments, each of the test signals may consist of the sum of two or more constant-amplitude carriers at a unique pair of frequencies. In still other embodiments, the test signals may be a constant-frequency carriers unique amplitudes or unique phases. In yet other embodiments, the test signals may consist of carriers modulated with unique duty cycles or unique digital message words, for example.

Of course, those skilled in the art will appreciate that the choice of carriers used in a test signal can influence the accuracy and speed with which these carriers are later detected. Thus, the carrier frequencies should be chosen in such a frequency range and with such a degree of proximity in frequency as to suit the operational requirements of the invention.

It should further be understood that the amplitude of each test signal should be sufficiently low compared to the amplitude of the corresponding optical signal whose intensity it modulates. In order to minimize the effects on degradation of the ability of downstream receivers to correctly detect the information on each of the wavelengths of the onward transmitted WDM input signal after switching, the modulation depth should be kept to below a few percent of the peak optical power and it may be beneficial to remove the test signal before leaving the switch 300, depending on the optical link design. Embodiments of the invention which provide removal of the test signals are discussed in greater detail later on.

With continued reference to FIG. 3, each of the N asymmetric optical splitters 330A . . . 330N is placed in the optical path of a respective WDM output signal travelling along a respective one of the output optical fibers 120A . . . 120N. It is to be understood that the optical splitters 330A . . . 330N may be placed following a respective plurality of amplifiers 240A . . . 240N (as shown) or preceding the amplifiers 240A . . . 240N. Although there is virtually no difference in performance of the path integrity analyzer 350, selection of one embodiment over the other may be made for the purposes of enhancing compatibility of the connection verification system with the optical switch described in U.S. patent application Ser. No. 09/580,495 to Graves et al., entitled "Optical Switch with Power Equalization", filed on May 30, 2000, assigned to the assignee of the present invention and hereby incorporated by reference herein.

The other M×K asymmetric optical splitters $340_{A,A} \ldots 340_{M,K}$ are placed in the optical path of those switched optical signals 260 that lead from the optical switch matrices 210A . . . 210M to the wavelength converting switch 220. Together, the relatively small number (i.e., N+(M×K)) optical splitters 330A . . . 330N, $340_{A,A} \ldots 340_{M,K}$ provide visibility of all of the M×(N+K) switched single-carrier optical signals 260 at the N+K output ports of each of the M optical switch matrices 210A . . . 210M.

Each asymmetric optical splitter can be of standard design and is constructed so as to allow a small percentage of light arriving along the corresponding optical path to be branched off towards the path integrity analyzer 350. A suitable amount of optical power tapped in this manner will be 10 dB to 13 dB below the optical power level of the incoming signal, which lowers the optical power level of the ongoing signal by only 0.46 dB to 0.22 dB, respectively. There will usually be little effect on the performance of downstream network elements or on that of the wavelength converting switch 220 as a result of splitting of a small amount of light in this manner, as it can be compensated for by a small increase in the gain of the corresponding one of the line-driving post-amplifiers 240A . . . 240N.

In addition, those skilled in the art will appreciate that each of the asymmetric optical splitters 330A . . . 330N located at the output of the switch can also be constructed so as to allow a small percentage of light arriving along the corresponding optical path to be branched off towards a power spectrum equalization system (or "equalizer") as described in above-referenced U.S. patent application Ser. No. 09/580,495. This would permit integration of a power equalization system together with a connection verification system.

The switch controller 310 provides a connection map to the optical switch matrices 210A . . . 210M and provides another connection map to the wavelength converting switch 220. These connection maps are also provided to the path integrity analyzer 350. The switch controller 310 further receives integrity information from the path integrity analyzer 350 in a suitable format. The switch controller 310 is similar to the switch controller 160 in the switch 200 of FIG.

2 but is additionally equipped with the capability to supply the path integrity analyzer 350 with connection maps and with the capability to handle integrity information received from the path integrity analyzer 350. The integrity information can be processed by the switch controller 310 or may be supplied in unmodified form to other network components external to the switch 300.

Figure 4:
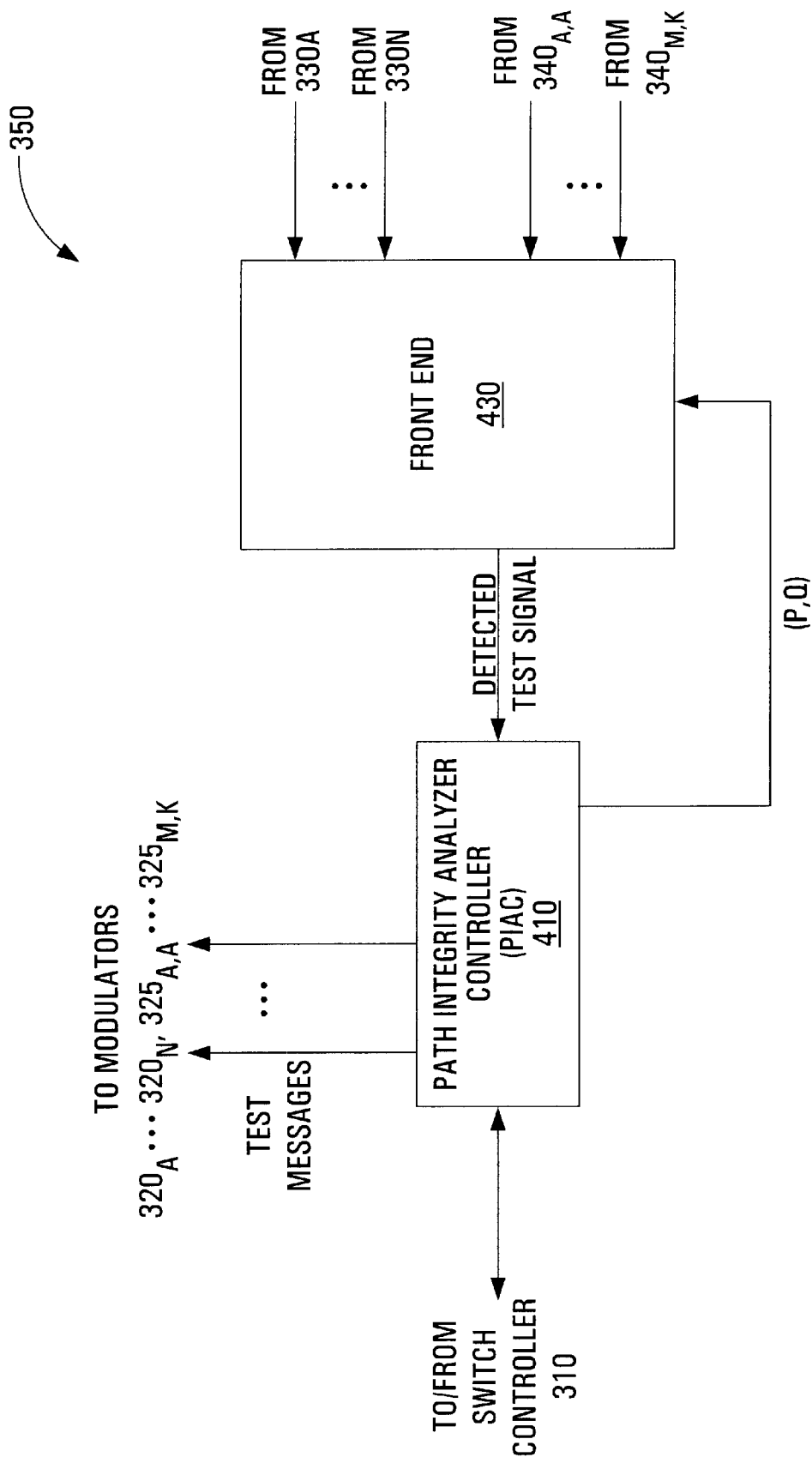
FIG. 4 shows in block diagram form a path integrity analyzer for use in the photonic switch of FIG. 3.

With reference now to FIG. 4, the path integrity analyzer 350 is seen to comprise a path integrity analysis controller (PIAC) 410 connected to the optical intensity controllers 320A ... 320N, to the optical intensity controllers $325_{A,A}$ ... $325_{M,K}$ and to a front end unit 430. The PIAC 410 will be described in more detail later on and is basically responsible for producing the test signals which modulate the WDM input signals and the single-carrier optical signals travelling between the wavelength converting switch 220 and the optical switch matrices 210A ... 210M. The PIAC 410 is also responsible for reading the test signals detected by the front end unit 430 and for validating connections by comparing detected test signals to "expected" test signals.

Thus, the path integrity analyzer 350 can fill any or all of three major roles: verification, diagnostic and servicing. The verification mode consists of confirming the presence or absence of the correct test signal in each switched single-carrier optical signal. The diagnostic mode pinpoints, in the event that an incorrect test signal is found to appear in a particular switched single-carrier optical signal, the source of such mis-connection. The servicing (signal-trace) mode can be entered upon external request from a user of a particular single-carrier optical signal (270 or 260) and who may require information about the connection involving that particular signal.

The front end unit 430 is responsible for detecting the test signal on each of the switched single-carrier optical signals 260 (see FIG. 3). The N WDM signals tapped by the splitters 330A ... 330N and the M×K single-carrier signals tapped by the splitters $340_{A,A}$ ... $340_{M,K}$ provide the front end unit 430 with complete visibility of all the switched single-carrier optical signals 260. However, test signal detection may or may not be performed simultaneously on all the switched single-carrier optical signals 260, depending on the design of the front end unit 430 as seen herein below.

Specifically, depending on the design of the front end unit 430, detection results might only be available at any given time for only a subset of the totality of switched single-carrier optical signals 260, and this subset is hereinafter referred to as the "currently available" subset. Among all "currently available" detected test signals, namely those corresponding to switched single-carrier optical signals 260 in the "currently available" subset, it is within the scope of the invention to feed all of these to the PIAC 410. It is also within the scope of the invention for the PIAC 410 to supply a select signal to a multiplexer in the front end unit 430 which selects only one of the currently available detected test signals. This select signal is hereinafter denoted (P,Q), where P and Q are used to identify the Pth output port of the Qth optical switch matrix 210Q.

Which switched single-carrier optical signals 260 form part of the "currently available" subset may depend solely on P or solely on Q or on both P and Q, depending on the internal structure of the front end unit 430. At the same time, the internal structure of the front end unit 430 affects the time required to obtain a reliable version of the detected test signal for each combination of P and Q. Individual designers may opt for different trade-offs in these two respects.

One possible embodiment of the front end unit 430 is now described with reference to FIG. 5A (others will be described later on with reference to FIGS. 5B through 5E). The front end unit 430 is seen to comprise a wavelength separation stage 430W and a detection stage 430D. Specifically, the wavelength separation stage has a set of N M-output WDD devices 520, one for each of the N WDM signals tapped by the splitters 330A ... 330N. Each of the M output ports of each of the N WDD devices 520, as well as each of the splitters $340_{A,A}$ ... $340_{M,K}$, is connected to a respective one of a plurality of optical receivers 530. Thus, there are M×(N+K) optical receivers 530, one for each of the M×(N+K) switched single-carrier optical signals 260, which means that the "currently available" subset includes the entire set of switched single-carrier optical signals 260.

Each of the optical receivers 530 comprises circuitry for transforming the corresponding received optical signal into electronic form. The optical receivers perform an envelope detection function rather than a high-speed data detection function and thus need only have an electrical bandwidth larger than the highest frequency of any test signal. Each of the optical receivers 530 is connected to a respective one of a plurality of test signal detectors 540.

Each of the test signal detectors 540 comprises suitable circuitry, software and/or control logic for detecting the presence of a test signal in the signal received from the respective optical receiver 530. Each test signal detector produces a detected test signal which may be fed directly to the PIAC 410 or, as shown, can be fed to a multiplexer 510A of standard design. The detected test signal indicates which test signal appears in the signal being processed by the corresponding test signal detector 540.

Each test signal detector 540 needs to extract a "clean" test signal which, as already mentioned, may consist of a carrier, a group of carriers or a carrier modulated with a digital message word, for example. To do this successfully, a test signal detector may need to detect very small variations in the envelope of the signal received from the corresponding optical receiver. However, the low-frequency components of the signal so received will be contaminated with low-frequency components of the traffic data stream, which act as a powerful interference source to corrupt the detection of the test signal. Fortunately, the low frequency components behave as a band-limited white noise source and hence are amenable to mitigation in much the same way as a white noise interference source.

Thus, when the test signal is a single carrier, for example, each test signal detector could contain a high-Q narrowband tuned filter set to the center frequency of that carrier. In addition, synchronous detection can be used in the test signal detectors 540, whereby the output of the high-Q narrowband filter is heterodyned with a sample of the expected carrier, in which case the spectral component of the resultant signal will produce a static d.c. signal, whereas other noise contributions (except that in the final smoothing circuit for the d.c. filter) will be eliminated. This permits a virtually zero-bandwidth measurement with a low noise component and high confidence.

When the test signal is a pair of carriers, two such high-Q narrowband tuned filters could be used. For the case where the test signal is a carrier modulated with a digital message word, the bandwidth of the low-pass filter used in filtering the homodyne beat signal would be set above the actual digital modulation bandwidth of the digital message word. Hence for a digital message word that is repeated every 10 ms (with, e.g., a 3.2 ms message length and a 6.8 ms gap between messages), the maximal message data rate of a 32-bit word would be on the order of 10 kb/s, while can readily be accommodated through a 5 kHz channel and therefore a low pass filter with a 5 kHz cut-off could be used.

By way of example, in a carrier-based implementation with carriers between 1 MHz and about 6 MHz (and with a 10% separation between carriers to allow easy separation and hence detection), there would be 20 usable carriers, namely at 1, 1.10, 1.21, 1.33, 1.46, 1.61, 1.77, 1.95, 2.14, 2.36, 2.59, 2.85, 3.14, 3.45, 3.80, 4.18, 4.59, 5.05, 5.56 and 6.12 MHz. In a single-carrier approach, it is possible to produce any of 20 test signals, but with dual carrier signaling, it is possible to produce any one of 400 test signals. This would permit a 400×400 WDM port switch to be tested, with a resultant wavelength count of 16,000×16,000 for a wavelength density of 40 wavelengths per fiber.

Figure 5A:
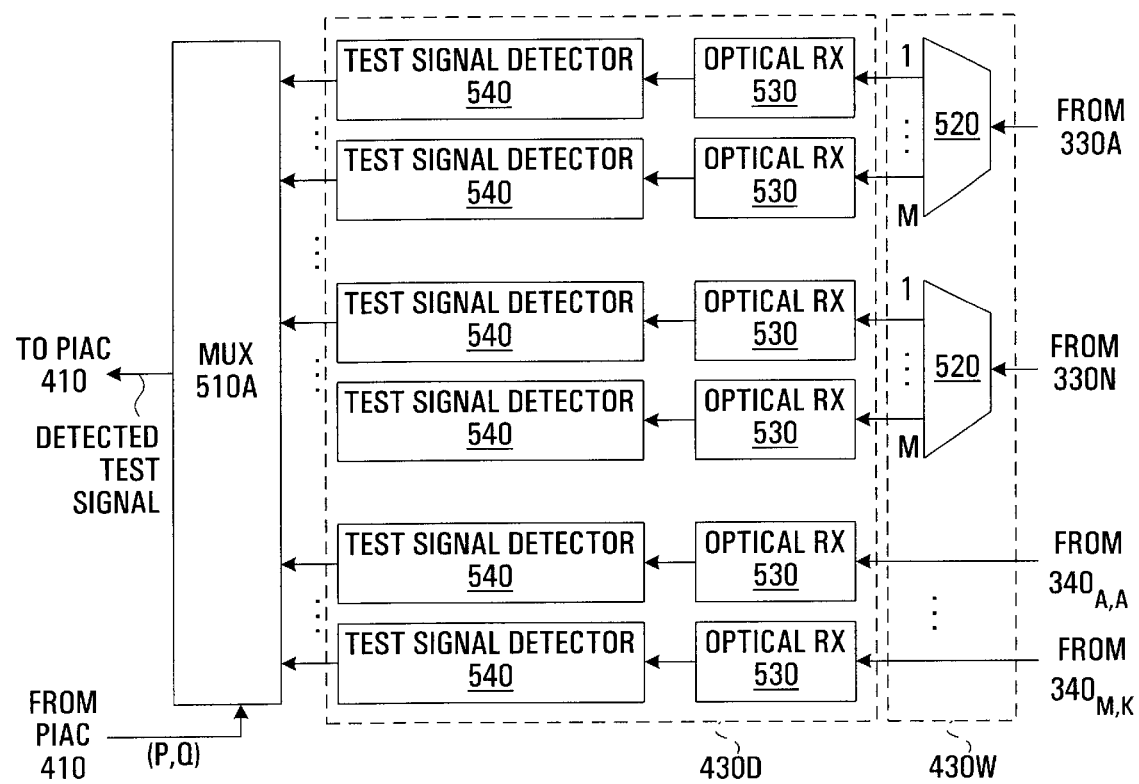
FIGS. 5A–5E show in block diagram form various embodiments of a front end for use in the path integrity analyzer of FIG. 4.

Since there are M×(N+K) test signal detectors 540 in the embodiment of FIG. 5A, the multiplexer 510A will have M×(N+K) data input ports. The multiplexer 510A also has a control port which is driven by the select signal (denoted (P,Q)) received from the PIAC 410 and which uniquely identifies the optical switch matrix and output port of a particular switched single-carrier optical signal. Of course, the multiplexer 510A of FIG. 5A could be dispensed with if the PIAC 410 has M×(N+K) parallel ports. In this case, processing of the output of each test signal detector 540 could be purely under software control of the PIAC 410. Thus, it should be understood that the multiplexer 510 (and others like it in FIGS. 5B through 5D) could be implemented in software, hardware or a combination of the two.

Since the "currently available" subset for the front end unit of FIG. 5A is the entire set of M×(N+K) switched single-carrier optical signals 260, a reliable version of the detected test signal for each combination of P and Q is available at any time and thus the test signal detectors 540 do not require an additional "settling time" other than an initial settling time interval. However, the absence of settling effects in the duration of the detection cycle comes at the expense of a high component count, since the front end unit of FIG. 5A requires the use of M×(N+K) optical receivers 530 and a like number of test signal detectors 540. Whilst the optical receivers only need have very narrow bandwidth and hence are likely to be available in low cost arrays, and likewise the test signal detectors 540 are likely to be available in an integrated multi-detector-per-ASIC form, the sheer number of receivers and test signal detectors may in some cases make this approach more expensive, bulky or power hungry than desired.

Figure 5B:
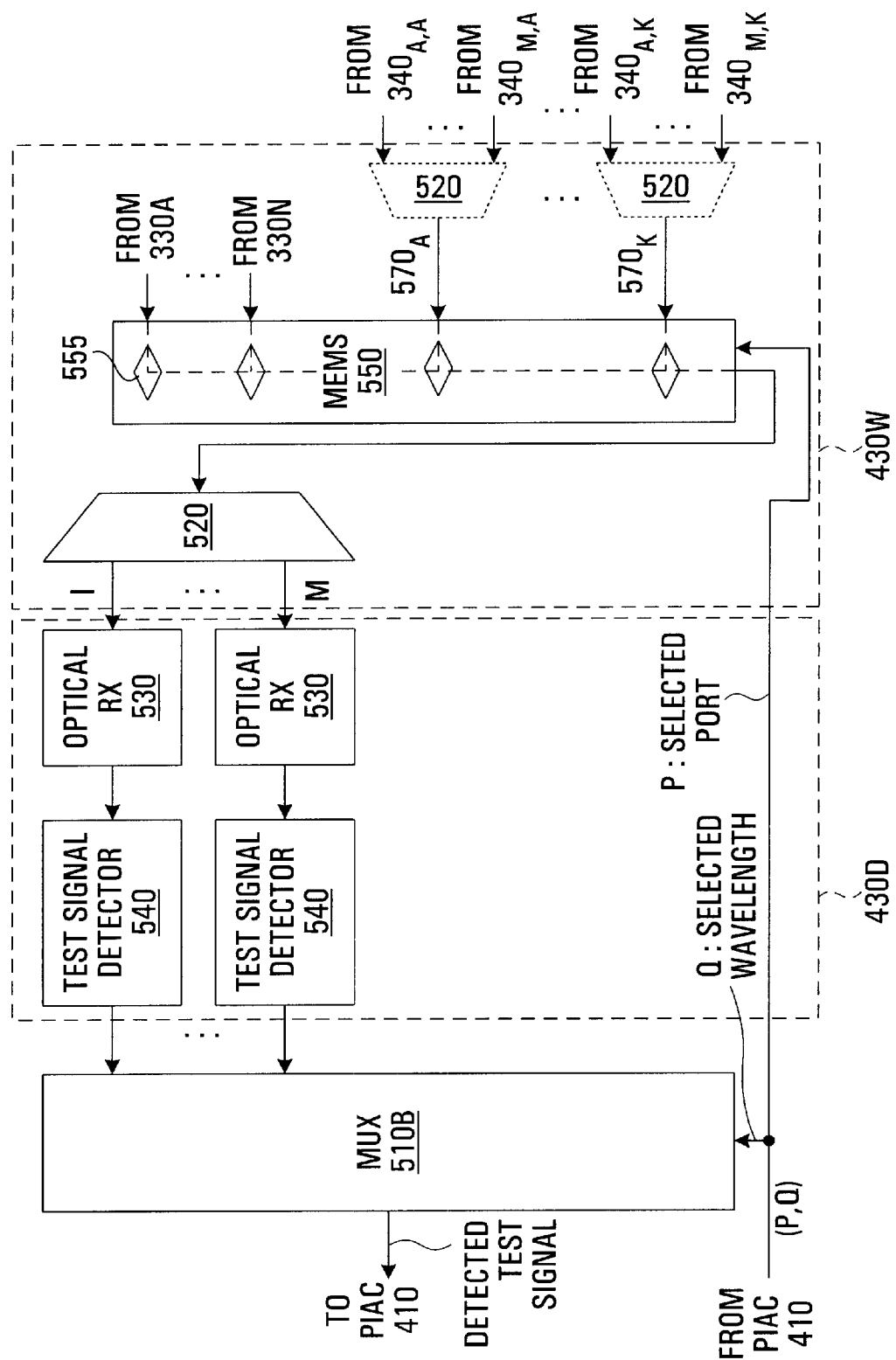

To reduce the component count at the expense of a reasonable increase in design complexity, various alternative embodiments of the front end unit 430 may be considered, for example those in FIGS. 5B through 5E. With reference to FIG. 5B, there is shown an embodiment of a front end unit 430 which dramatically reduces the required number of optical receivers 530 and test signal detectors 540 to M each.

In order to achieve this reduced level of complexity, the wavelength separation stage 430W comprises an optical switch matrix 550, which could be (but is not restricted to being) a MEMS device such as described in the above-referenced article by Lih Y. Lin. The optical switch matrix 550 receives the N WDM signals tapped by the splitters 330A . . . 330N as well as K WDM signals 570A . . . 570K which are derived from having selectively re-combined the M×K single-carrier signals tapped by the splitters 340$_{A,A}$ . . . 340$_{M,K}$ into K groups. Of course, those skilled in the art will appreciate that re-combination may be performed inside or outside the wavelength separation stage 430W. Performing the re-combination outside the wavelength sepa-ration stage and closer to the splitter point would allow simplification of the interconnect to the path integrity analyzer 350.

Among the output ports of the optical switch matrix 550, only one need be used and is connected to an M-output WDD device 520 much like the one in FIG. 5A. An array of mirrors 555 in the optical switch matrix 550 can be raised or lowered to deflect any specific input onto the output in accordance with a control signal. The control signal associated with the Qth optical switch matrix 210Q specifies the Pth input port of that optical switch matrix.

Each output port of the M-output WDD device 520 is connected to a respective one of a plurality of optical receivers 530 in the detection stage 430D. The optical receivers 530 can be identical to the optical receivers suitable for use in the embodiment of FIG. 5A. In the embodiment of FIG. 5B, it is seen that there are M optical receivers 530, which means that the "currently available" subset includes only M out of M×(N+K) switched single-carrier optical signals 260, which correspond to all the wavelengths on one specific, selected output port. This approach may be referred to as the "output-port-sequential-summing" (OPSS) approach. Hence, using the OPSS approach, in order to test all of the outputs, the front end unit 430 has to be stepped through N+K phases or configurations, by a process of raising or lowering individual mirrors 555. This process will lead to a corresponding slowdown of the overall verification process.

Each of the optical receivers 530 is connected to a respective one of a plurality of test signal detectors 540, which can be identical to any of the test signal detectors suitable for use in the embodiment of FIG. 5A. Thus, each test signal detector 540 comprises suitable circuitry, software and/or control logic for detecting the presence of a test signal in the signal received from the respective optical receiver 530.

Each of the M test signal detectors 540 produces a detected test signal which is fed to the PIAC 410 either directly or, as shown, via a multiplexer 510B. The multiplexer 510B needs to have only M data input ports, one for each of the M switched single-carrier optical signals in the "currently available" subset which, in the OPSS approach, corresponds to all M wavelengths on one specific, selected output port. The multiplexer 510B also has a control port which is driven by the portion of the select signal from the PIAC 410 which contains the identity of the Qth wavelength (out of a possible M wavelengths).

Having reduced the number of optical receivers 530 and test signal detectors 540 to M in each case, it becomes of interest to know what effect this has on the detection cycle time. In the embodiment of FIG. 5B, it is noted that each time a different value of P is provided by the PIAC 410, the optical switch matrix 550 raises a different mirror and the test signal detectors 540 must start the detection process from scratch. Thus, an amount of time (called a "settling time") must elapse before the outputs produced by the test signal detectors 540 are reliable. Since P is less than or equal to N+K, the duration of a detection cycle which is due to settling will be equal to (N+K) times the "settling time".

In general, if $T_{SETTLE}$ is used to denote the settling time, i.e., the time it takes for a connection integrity verification detector to begin producing a reliable measurement, and if $\mu$ is used to denote the total number of switched single-carrier optical signals (in this case M×(N+K)) divided by the size of the "currently available" subset, then the total settling time will be equal to $\mu \times T_{SETTLE}$. The "settling time" (denoted $T_{SETTLE}$) depends on the switching time of the MEMS switch as well as the carrier frequencies selected as test signals and, in the case of modulated carrier, on the modulated carriers' data rates.

Figure 5C:
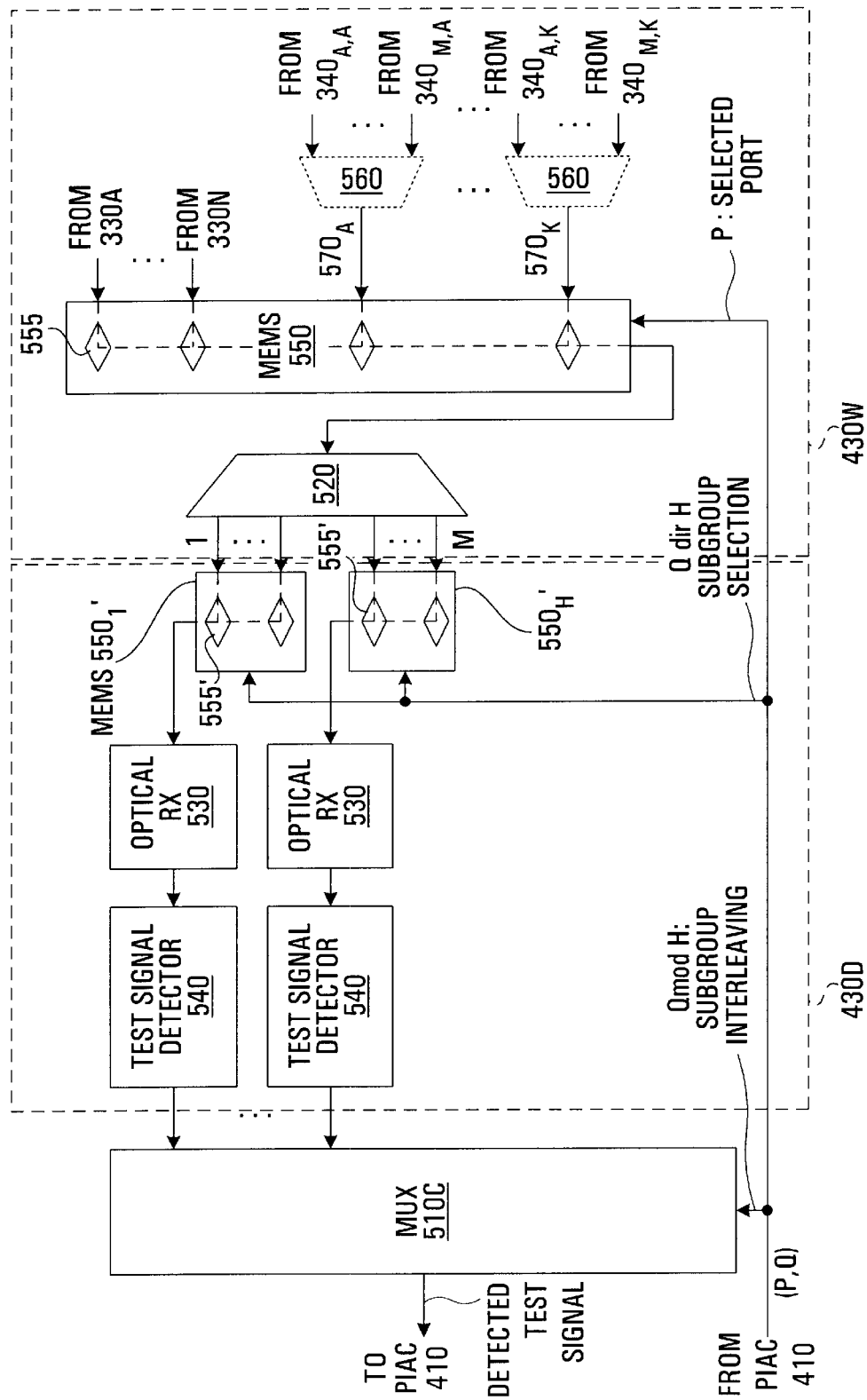

Next, in FIG. 5C, there is shown another embodiment of the front end unit 430 where the number of optical receivers 530 and test signal detectors 540 has been reduced to H each (where H is equal to 2 in the embodiment of FIG. 5C). This reduced complexity is achieved by providing an optical switch matrix 550 for receiving the N WDM signals tapped by the splitters 330A . . . 330N and the K WDM signals 570A . . . 570K formed in the previously described manner, combined with a second set of optical switch matrices 550'$_1$ . . . 550'$_H$ for selection of individual optical carriers.

Among the output ports of the optical switch matrix 550, only one need be used and is connected to the input port of an M-output WDD device 520 much like the one in FIGS. 5A and 5B. The array of mirrors 555 in the optical switch matrix 550 can be raised or lowered in accordance with a control signal which is again the portion of the select signal which identifies the selected output port, denoted P.

The M output ports of the M-output WDD device 520 are recombined in groups by a set of H optical switch matrices 550'$_1$ . . . 550'$_H$, among which only two are shown in FIG. 5C. The value of H is determined by the practical switch sizes available and the number of parallel sets of test signal detectors 540 and optical receivers 530 required to achieve an adequate connection verification response time. Therefore the required number of sets of test signal detectors and optical receivers is determined by the response time requirements of the verification system, while the number and size of the optical switch matrices 550'$_1$ . . . 550'$_H$ is determined by the number of sets of test signal detectors and optical receivers.

The array of mirrors 555' in each optical switch matrix 550' can be raised or lowered in accordance with a subgroup selection signal which is equal to Q div H (i.e., the number of times Q divides H). An output port of each of the optical switch matrices 550' is connected to a respective one of a like number of optical receivers 530. In this embodiment, it is seen that the size of the "currently available" subset is equal to the number of optical receivers 530, which is equal to H.

Each of the optical receivers 530 is connected to a respective one of a plurality of test signal detectors 540, which can be identical to any of the test signal detectors suitable for use in the embodiments of FIGS. 5A and 5B. Thus, each test signal detector 540 comprises suitable circuitry, software and/or control logic for detecting the presence of the test signal in the signal received from the respective optical receiver 530. Each of the test signal detectors 540 produces a detected test signal which is fed to a data input port of a multiplexer 510C. The multiplexer 510C has only H data input ports and also has a select port which is driven by a subgroup interleaving signal received which is equal to Q mod H, i.e., the remainder after dividing Q by H.

In terms of effects on the duration of a detection cycle, it is seen that $\mu$, being equal to M×(N+K) divided by the size of the "currently available" subset, is equal to (M×(N+K)÷H). Thus, the portion of the detection cycle time due to settling is equal to $T_{SETTLE}$×(M×(N+K)÷H).

Figure 5D:
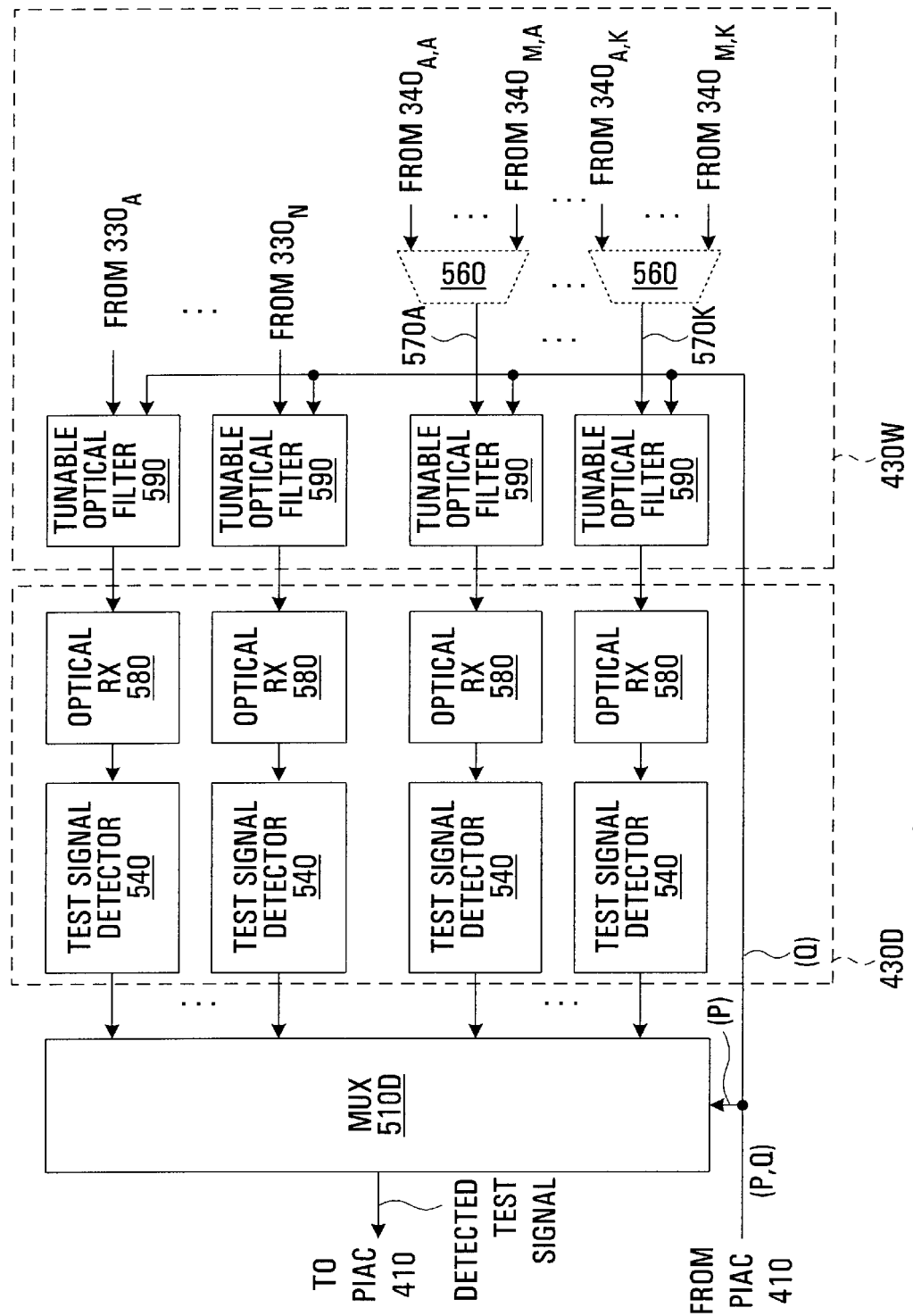

FIG. 5D shows another alternative embodiment of the front end unit, wherein a total of N+K tunable optical filters 590 are provided, each of which receives either a respective one of the N WDM signals tapped by the splitters 330A . . . 330N or a respective one of K WDM signals 570A . . . 570K formed in the previously described manner. Each tunable optical filter may be of standard design and may comprise circuitry for admitting the portion of the power of the received optical signal contained in a controllable optical passband. The optical passband is controllable in accordance with the portion of the select signal which specifies Q, corresponding to the selected optical switch matrix 210Q.

Each of the tunable optical filters 590 is connected to a respective one of a plurality of optical receivers 530. In this embodiment, it is seen that there are N+K optical receivers 530, which means that the "currently available" subset includes only N+K out of the M×(N+K) switched single-carrier optical signals 260. Each of the optical receivers 530 is connected to a respective one of a plurality of test signal detectors 540, which can be identical to any of the test signal detectors suitable for use in the embodiments of FIGS. 5A, 5B and 5C. Thus, each of the N+K test signal detectors 540 comprises suitable circuitry, software and/or control logic for detecting the presence of the test signal in the signal received from the respective optical receiver 530.

Each of the N+K test signal detectors 540 produces a detected test signal which is fed to a data input port of a multiplexer 510D. The multiplexer 510D has N+K data input ports, one for each of the N+K switched single-carrier optical signals in the "currently available" subset. The multiplexer 510D also has a select port which is driven by the portion of the select signal from the PIAC 410 that identifies P, the selected output port of the Qth optical switch matrix 210Q.

In terms of detection cycle time, it is noted that whenever a different value of Q is provided by the PIAC 410, the optical switch matrix 550 raises a different mirror and $T_{SETTLE}$ seconds must elapse before reliable results are obtained. Therefore, since Q is less than or equal to M, a detection cycle will have a portion due to settling that is equal to M×$T_{SETTLE}$ seconds.

Figure 5E:
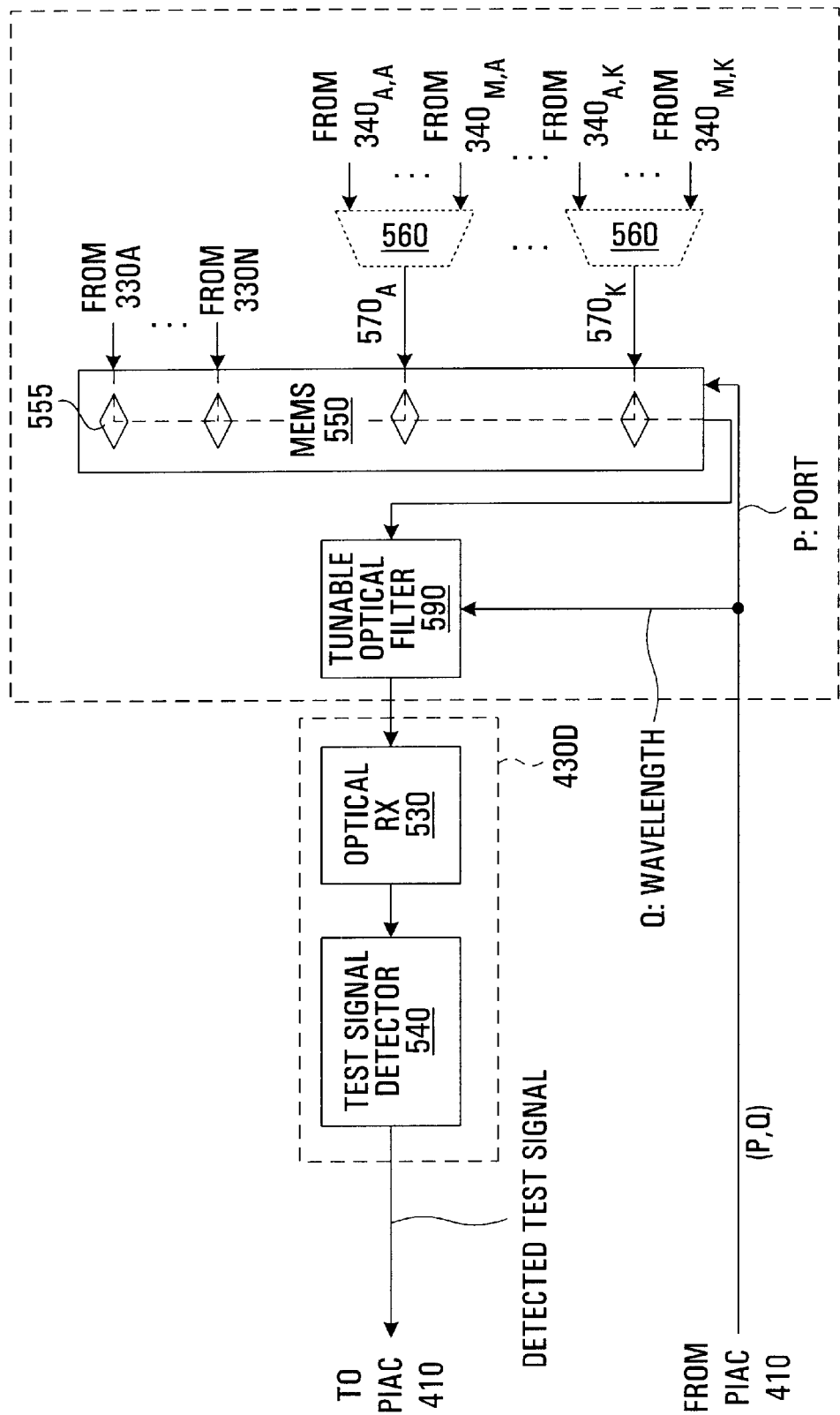

Another embodiment of the front end unit 430 is shown in FIG. 5E, where there is provided a single optical switch matrix 550 connected to a single tunable optical filter 590, which is connected to a single wide-optical-bandwidth receiver 530, which is in turn connected to a single test signal detector 540. No multiplexer is required in this embodiment. The optical switch matrix 550 receives the N WDM signals tapped by the splitters 330A . . . 330N as well as the K WDM signals 570A . . . 570K formed in the previously described manner.

In order to perform test signal detection for the single-carrier optical signal specified by P (the output port) and Q (the wavelength), P is provided to the optical switch matrix 550 and Q is provided to the tunable optical filter 590. While the embodiment of FIG. 5E is clearly the most efficient in terms of component usage, it has a longer detection cycle time due to settling. This is due to the fact that the test signal detector 540 must start its detection operation "from scratch" each time either P or Q is changed in the select signal (P,Q) received from the PIAC 410. Thus, the detection cycle time due to settling will equal (M×(N+K))×$T_{SETTLE}$.

To summarize the various embodiments of the front end unit illustrated in FIGS. 5A through 5E, reference is made to the tables in FIG. 7A and 7B, which show the component count as well as the detection cycle time due to settling associated with each embodiment of the front end unit. FIG. 7A shows the general results for arbitrary M, N, K and average $T_{SETTLE}$. Of course, those skilled in the art will understand that each type of component has its own settling or tuning time. Nonetheless, it is useful to consider the impact of an average settling time of $T_{SETTLE}$=10 ms in the case where M=40 wavelengths, N=24 input optical fibers, K=8 wavelength conversion input/output ports per optical switch matrix and H=4. Using this data, FIG. 7B evidences the trade-off between the detection time due to settling and the total component count for each of the embodiments of FIGS. 5A through 5B.

It should be recognized that if the optical switch matrices 550, 550' in the front end unit 430 are (N+K)-input optical switch matrices, then it is possible to integrate these optical switch matrices with the optical switch matrices 210A . . . 210M in the switching core 250. Thus, in designing a card cage for housing the optical switch matrices 210A . . . 210M forming part of the switching core 250, it is within the scope of the invention to provision additional slots not only for use with spare optical switch matrix cards but also for use with the optical switch matrix cards 550, 550' needed by the front end unit 430.

Those skilled in the art will also appreciate that in the embodiments of FIGS. 5A to 5D, the respective multiplexer could be dispensed with, in which case multiple detected test signals could be supplied simultaneously to different input ports of the PIAC 410.

The above description of the embodiments of FIGS. 5A-5E has shown how the PIAC 410 can be provided with the detected test signal resulting from the front end unit 430 having performed a test signal detection operation on a particular single-carrier optical signal which is uniquely specifiable by the values of P (output port) and Q (wavelength) in the select signal (P,Q). The role of the PIAC 410 is then to compare each detected test signal with an "expected" test signal in order to determine whether there is consistency with the connection map.

Figure 6:
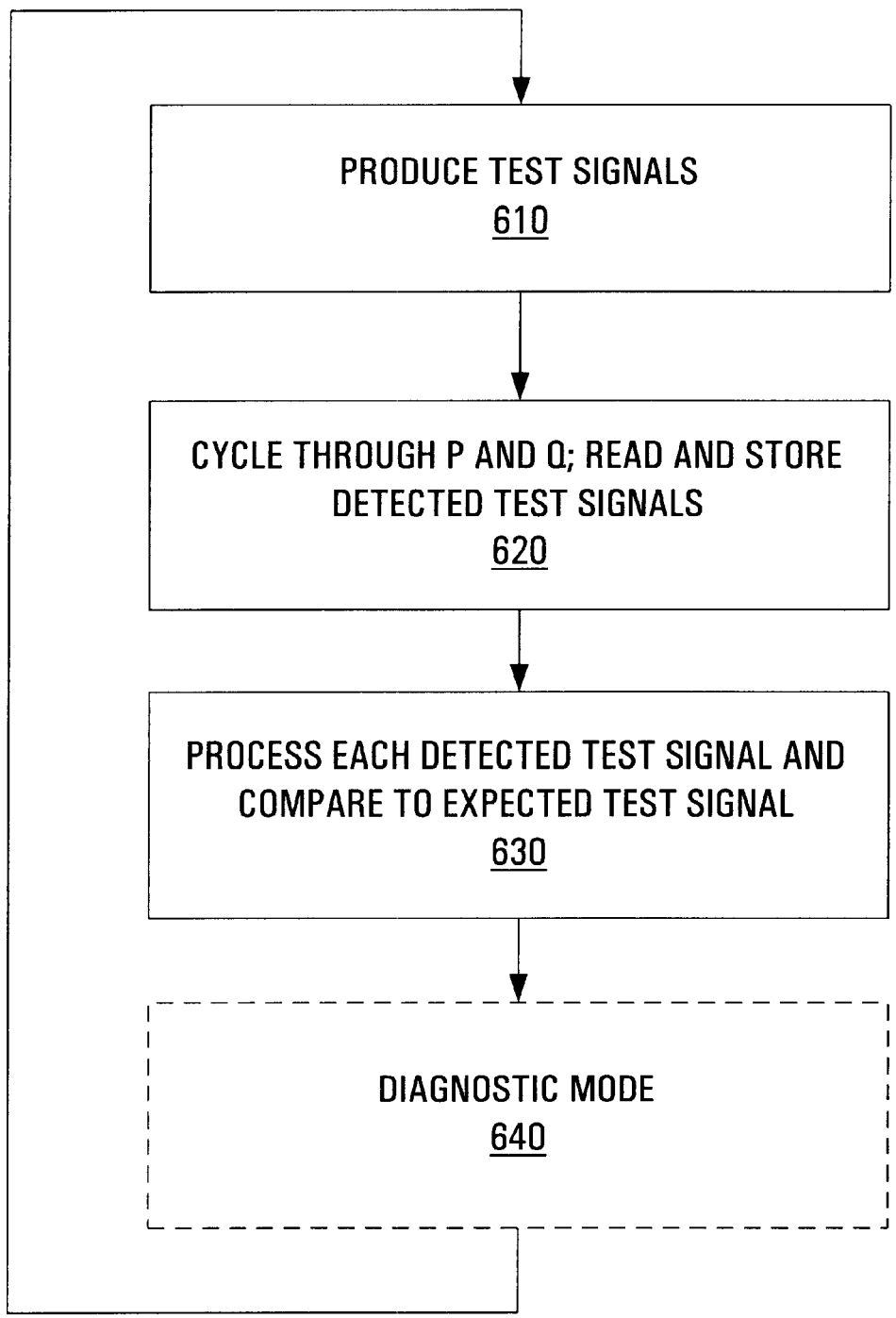
FIG. 6 is a flowchart illustrating operation of the path integrity analysis controller for use in the path integrity analyzer of FIG. 4.

The PIAC 410 may be implemented as circuitry, software, control logic or a combination thereof. To permit operation in more than one mode from among verification, diagnostic and servicing, the software or hardware resources of the PIAC 410 can be split up into several parts. If implemented as software, the PIAC 410 may include program code instructions stored on a computer-readable medium. The program code instructions define a connection integrity verification algorithm to be followed by the PIAC 410. The algorithm for the verification function is now described with additional reference to the flowchart in FIG. 6.

The connection verification algorithm now described refers to the verification of all "type 1", "type 2" and "type 3" connections but those skilled in the art may adapt the algorithm to the verification of any subset of these connections or any subset of connections for a given type of connection.

Step 610

The PIAC 410 produces N different test signals which are fed to the optical intensity controllers 320A . . . 320N. The PIAC 410 also produces M×K different test signals which are fed to the optical intensity controllers $325_{A,A}$ . . . $325_{M,K}$.

Step 620

The PIAC 410 determines which test signal has been detected on each of the switched single-carrier optical signals 260. To determine which test signal appears in the particular switched single-carrier optical signal associated with the Pth output port of the Qth optical switch matrix 210Q, the PIAC 410 sends a select signal (containing the values of P and Q) to the front end unit 430.

In a single carrier scenario, the detected test signal contains a unique carrier frequency for each combination of P and Q. In a dual carrier scenario, the detected test signal contains a unique pair of carrier frequencies, denoted $f_{OUT,P,Q,1}$ and $f_{OUT,P,Q,2}$, for each combination of P and Q. In a modulated carrier scenario, the detected test signal contains a unique digital message word for each combination of P and Q. The PIAC 410 reads and stores the unique property of the detected test signal in local memory, for example in an array structure. In one specific embodiment, there may be one (N+K)-element array per optical switch matrix, with each element containing the identity of two detected frequencies.

The PIAC 410 cycles through all values of P and Q and thus determines the test signal appearing in each of the switched single-carrier optical signals 260. In order to cycle through all values of P (from A to (N+K)) and Q (from A to M), a counter and parallel bus structure may be used. Each bit of the counter could be a separate line on the bus and the current value of P may be taken as the most significant bits on the bus, while the current value of Q can be taken as the remaining bits on the bus.

Figure 8:
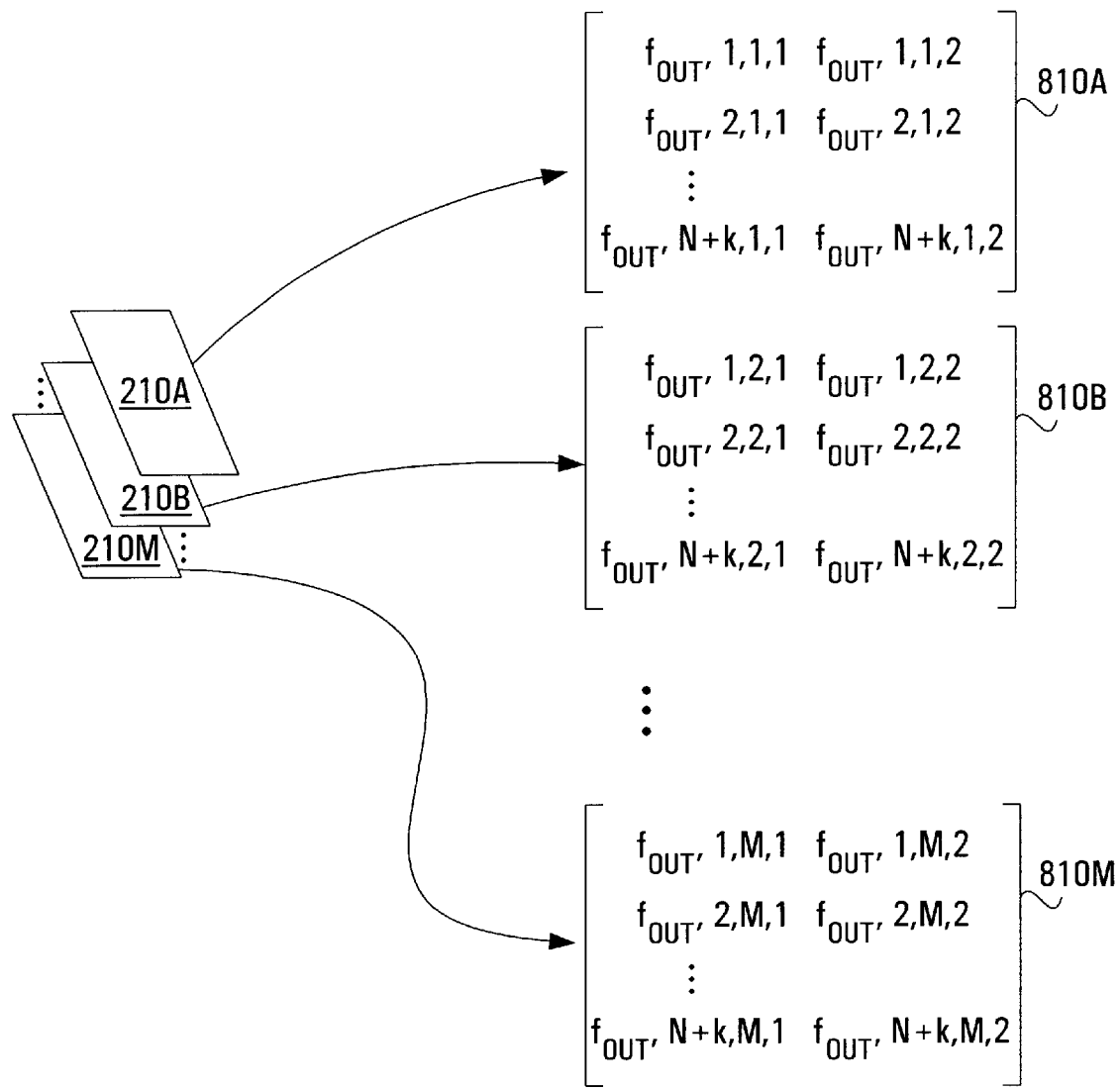
FIG. 8 shows a possible array structure in local memory for storing detected connection integrity verification messages.

After cycling through all values of P and Q for the case where two frequencies are associated with each test signal, the local memory will be populated as illustrated in FIG. 8. Specifically, each array from a set of arrays 810A . . . 810M is associated with a respective one of the optical switch matrices 210A . . . 210M. The $n^{th}$ row of the array associated with a particular optical switch matrix contains the two frequencies thought to be contained in the switched single-carrier optical signal emerging from the $n^{th}$ port of that optical switch matrix. Thus, in a DTMF-like scenario, the $n^{th}$ row of the $m^{th}$ array 810m contains two elements denoted $f_{OUT,n,m,Z}$, for $Z \in \{1, 2\}$. It is recalled that "n" ranges from A . . . N+K and "m" ranges from A . . . M.

Step 630

At STEP 630, each detected test signal is processed by the PIAC 410 in order to determine whether it corresponds to an "expected" test signal, namely the test signal that would have been detected if the connection maps of the optical switch matrices 210A . . . 210M and the wavelength converting switch 220 were executed properly. Those skilled in the art will appreciate that the "expected" test signal corresponding to a particular output port on a particular optical switch matrix (i.e., corresponding to a particular value of P and Q) can be derived from the connection map of each optical switch matrix as provided by the switch controller 310.

In a dual-carrier scenario, a separate verification operation can be performed for each of the arrays 810A . . . 810M (i.e., for each optical switch matrix), by comparing each element of the array to an "expected" carrier frequency.

If there is a match between the detected and expected test signals for a particular combination of P and Q, then the connection for the corresponding switched single-carrier optical signal is deemed valid; otherwise, it is deemed erroneous. If an erroneous connection is detected, then the connection verification algorithm may enter the diagnostic mode at step 640, where the PIAC 410 searches for the source of the faulty connection.

Thus, it has been shown how the present invention provides connection verification functionality in a photonic switch. The uses of such functionality are many and varied, and include status reporting, protection switching, performance monitoring, testing, and so on. Moreover, complete visibility of all the signals being switched by all of the optical switch matrices 210A . . . 210M is provided by a system with a relatively small number of components, including a path integrity analyzer, N optical intensity controllers and N+(M×K) asymmetric optical splitters. Thus, the system of the present invention adds considerable functionality at reasonably low additional cost.

Of course, those skilled in the art will appreciate that numerous variations and modifications of the present invention are possible. For example, by adding splitters at the K×M outputs of the wavelength converting switch 220 and by analyzing the contents of the optical signals so tapped, it is possible to verify the integrity of the switching operations performed by the wavelength converting switch 220.

Also, in other embodiments, the same test signal could be used for all optical signals but in a sequential manner. In such a scenario, there would be a need for a demultiplexer in the PIAC 410 so that the test signal could be routed to a selected one of the optical intensity controllers 320A . . . 320N, $325_{A,A}$ . . . $325_{M,K}$. Consequently, a complete detection cycle would require (N+M×K) passes for the entire range of P and Q, one pass being required for each time a different WDM input signal is selected to be modulated with the test signal.

In this case, the verification process at the PIAC 410 is (N+M×K) times more computationally intense, as a comparison operation is performed for each combination of test signal and switched single-carrier optical signal. However, the test signal detectors 540 can be simplified, as they need only conclude the presence or the absence of one single test signal in the switched single-carrier optical signal they are currently processing. To enhance detection accuracy, the test signal itself may be supplied from the PIAC 410 to the test signal detectors 540, thereby to serve as a reference signal.

It should also be appreciated from the above description that the electronic signals produced by the optical receivers 530 can be used not only for connection verification but also for other purposes such as power estimation. Thus, the functionality of the test signal detectors 540 may be enhanced to include other capabilities such as power estimation as described in more detail in above-referenced U.S. patent application Ser. No. 09/580,495. Therefore, it is within the scope of the present invention to allow hardware sharing in order to provide dual functionality, i.e., connection verification functionality and power estimation functionality.

Also, in the above embodiments, the set of M×K optical splitters $340_{A,A}$ . . . $340_{M,K}$ intercepts the single-carrier optical signals travelling from the optical switch matrices 210A . . . 210M to the wavelength converting switch 220. However, it is possible to avoid the need for the splitters $340_{A,A}$ . . . $340_{M,K}$ if the electrical counterparts to these signals are tapped directly from within the wavelength converting switch 220. For example, if the wavelength converting switch 220 consists of a plurality of opto-electronic converters, an electrical switch and a plurality of electro-optic converters, then the output of each opto-electronic converter provides an electrical signal which can be used by the test signal detector(s) 540 in the front end unit 430. Of course, the electrical signals received from the wavelength converting switch 220 will be high-speed signals and may need to undergo an envelope detection step before processing by the connection integrity verification detectors, but this may be acceptable, given the elimination of the splitters $340_{A,A}$ . . . $340_{M,K}$ and the optical receivers 530 from the front end unit 430.

Also in the specific embodiments of the front end unit 430 described herein above with reference to FIGS. 5B, 5C and 5E, only one output port of each of the optical switch matrices 550 has been used and the mirror to be raised in each case is controlled by the appropriate portion of the select signal received from the PIAC 410 and denoted (P,Q). However, it is to be appreciated that the remaining output ports could also be put to use, for example in feeding a diagnostic utility.

For example, the PIAC 410 can generate a diagnostic select signal which causes a second optical signal to appear at a second output port of the optical switch matrices 550 of FIGS. 5B, 5C and 5E. The second signal is different from the one currently exiting the first output port by virtue of the current value of the select signal. The second optical signal can be referred to as a diagnostic signal and may be converted, demodulated and processed by a diagnostic controller which can be merged with the PIAC 410. The diagnostic controller may run a sophisticated trouble-shooting algorithm in parallel with the connection integrity verification algorithm of the PIAC 410 previously described with reference to FIG. 6.

It is also noted that in the above-described embodiments, the test signals applied to a particular WDM input signal or to a particular single-carrier optical signal entering an optical switch matrix via the wavelength converting switch 220 remain on the optical signal after switching. As a result, the signals which propagate out of the switch 300 onto output optical fibers 140A . . . 140N will have optical intensities that are modulated with test signals. This phenomenon occurs during the connection verification process which may run continuously and thus may in some cases have an adverse effect on the performance of downstream equipment. Since it is expected that there will be multiple switches in a photonic network and since the modulation will propagate out of the switch on the optical carriers to the next switch, the path integrity check system of one switch could interfere with the path integrity check system of the next switch unless certain preventative measures are taken.

Specifically, the signal leaving the optical switch will consist of WDM streams in which each of the individual optical carriers will have a few percent amplitude modulation at uncorrelated test signal frequencies. These frequencies, if onwardly propagated to downstream nodes, could prevent these nodes from using the same set of test signal frequencies, forcing the planning of test signal frequencies to be effected at the level of the network, rather than at the level of each node. This may limit the flexibility of the network and the size it can grow to before the restriction in the number of available carriers and/or the complexity of the test signal detector to discriminate ever more tightly packed carriers becomes a limiting factor.

The present invention provides at least two methods that can be used to avoid interference to downstream network equipment, namely (1) suppressing the onward propagation of the carriers by removing the test signals and (2) using a test signal that does not cause interference with the operation of the next switch down the line.

The first of these methods can be implemented by introducing anti-phase modulation of the same test signal carriers at a place near the output, but before the final WDM device (since the output carriers passing through that multiplexer could have come from any input and hence will contain a variety of test signal carriers). This can be achieved by introducing an additional gain adjustment point immediately prior to the WDM device, in the form of an EDFA (Erbium Doped Fiber Amplifier) array. The use of the EDFA for this purpose may be combined with the use of the EDFA to control the power spectrum of the WDM signals output by the switch, as described in above-referenced U.S. patent application Ser. No. 09/580,495.

The anti-phase signal can be derived from the detection stage in the front end unit 430 by tapping the output of each receiver 530 and passing this signal through an inverting amplifier. Thus, the closed loop from the EDFAs through the WDM devices 140A . . . 140N, through the splitters 330A . . . 330N and back through the wavelength separation stage in the front end unit 430 creates a self-adjusting compensation block that reduces the level of the residual output carrier to the detection threshold of the test signal detector. Of course, complete cancellation can be used whenever a particular wavelength is not being tested which, for the scanning versions of the front end 430, will be the case during an overwhelming majority of the time.

The second of the above methods (i.e., using a test signal that does not cause interference with the operation of the next downstream switch) is best suited to test signals that consist of a digital word modulated onto a carrier. In this case, different switches would simply use different carrier frequencies, although the carrier frequency impressed onto all inputs of the same switch would be the same, with the digital carrier modulation serving as the differentiator between the various inputs.

Thus, for example, the use of a simple repetitive 32-bit word would allow up to $2^{32}$ (approximately $10^{10}$) switch inputs, while the interference between switch sites would be eliminated by allocating each switch site a different analog carrier frequency. In this case, the example frequency plan shown earlier (between 1 MHz and 6 MHz) would allow for up to 20 switches to coexist in a network without interference issues. Moreover, by using sharper filtering and receiving techniques, such that a fixed passband receiver (say ±50 kHz) can be set on 100 kHz intervals, then up 50 channels (i.e., 50 switches) could be provided with carriers between 1 and 6 MHz. Of course, other frequency plans and channelization widths are possible to permit higher counts, although narrowing receiver bandwidth may extend the settling time required before reliable measurements are available.

Those skilled in the art should further appreciate that the optical switching could be performed by switch fabrics other than those based on MEMS devices, for example liquid crystal switching fabrics, bubble (total internal reflection) switching fabric, thermo-optic switching fabrics, etc. Of course, if the chosen switch fabric has the possibility of establishing an erroneous connection such that a signal on one wavelength is connected into an outgoing connection intended for another wavelength, then this error will not be detectable by the use of a connection verification signal as contemplated herein since the wavelength would not be interpreted as incorrect. Therefore, the present invention is best suited for use in optical switches where there are no physical paths between wavelength planes, although there may be mis-connections within each individual wavelength plane.

While specific embodiments and variations of the present invention have been described and illustrated, it will be apparent to those skilled in the art that numerous further modifications and variations can be made without departing from the scope of the invention as defined in the appended claims.

We claim:

1. A switch for optical signals, comprising:
   a plurality of wavelength division demultiplexers (WDDs), each having an input port and a plurality of output ports;
   a plurality of wavelength division multiplexers (WDMs), each having an output port and a plurality of input ports;
   an optical switching core having a plurality of input ports at which optical signals enter said core and a plurality of output ports at which optical signals exit said core, a subset of the input ports of said core being connected to the output ports of said WDDs and a subset of the output ports of said core being connected to the input ports of said WDMs, said core being capable of establishing photonic connections between said subset of its input ports and said subset of its output ports in response to an indication of desired connections;
   a plurality of optical intensity controllers, each connected to the input port of a corresponding one of said WDDs and adapted to vary the intensity of an input multi-carrier optical signal entering the input port of said corresponding one of said WDDs;
   a plurality of optical splitters, each connected to the output port of a corresponding one of said WDMs and adapted to tap a fraction of the intensity of an output multi-carrier optical signal exiting the output port of said corresponding one of said WDMs; and
   a connection verification unit connected to said optical intensity controllers and to said optical splitters, said connection verification unit being operable to:
   (a) control said optical intensity controllers so as to cause a test signal to be applied to at least one of the input multi-carrier optical signals;
   (b) determine, on the basis of at least one of the desired connections and for at least one of the signals exiting said subset of the output ports of said core, which test signal is expected to appear in said at least one of the signals exiting said subset of the output ports of said core;
   (c) process the output multi-carrier optical signals tapped by said optical splitters in order to detect which test signal, if any, appears in said at least one of the signals exiting said subset of the output ports of said core; and
   (d) compare the detected and expected test signals, thereby determining whether said at least one of the desired connections has been correctly established by said core.

2. A switch as claimed in claim 1, wherein the connection verification unit comprises:
   a first stage, for separating the output multi-carrier optical signals tapped by said optical splitters into single-carrier component signals corresponding to said at least one of the signals exiting said subset of the output ports of said core;
   a second stage connected to the first stage, for detecting test signals appearing in said single-carrier component signals; and
   a third stage connected to the second stage, for comparing the test signals detected in said single-carrier component signals to the test signals expected to appear in the corresponding signals exiting said subset of the output ports of said core.

3. A switch as claimed in claim 2, wherein the second stage is further operable to convert each single-carrier component signal into an electrical signal prior to detecting the test signals appearing in said single-carrier component signals.

4. A switch as claimed in claim 3, wherein each electrical signal has a data bandwidth narrower than that of the single-carrier component signal from which it is obtained.

5. A switch as claimed in claim 2, wherein said first stage comprises a plurality of second WDDs, each having a respective plurality of output ports and having a respective input port connected to a respective one of the optical splitters.

6. A switch as claimed in claim 5, wherein the second stage comprises:
a plurality of optical receivers, each receiver having an output port and having an input port connected to a corresponding one of the output ports of one of the second WDDs; and
a plurality of test signal detectors, each test signal detector having an output port and having an input port connected to a respective one of the optical receivers.

7. A switch as claimed in claim 2, wherein said first stage comprises a plurality of tunable optical filters, each having an output port and having an input port connected to a respective one of the optical splitters, each tunable optical filter being adapted to admit an optical signal in a selected optical frequency range through to said second stage.

8. A switch as claimed in claim 7, wherein the connection verification unit comprises a controller for controlling application of the test signals by the intensity controllers and for selecting the optical frequency range admitted by at least one tunable optical filter.

9. A switch as claimed in claim 7, wherein the second stage comprises:
a plurality of optical receivers, each receiver having an output port and having an input port connected to the output port of a corresponding one of the tunable optical filters; and
a plurality of test signal detectors, each test signal detector having an output port and having an input port connected to a respective one of the optical receivers.

10. A switch as claimed in claim 2, wherein the first stage comprises:
an optical switching element having an output port and having a plurality of input ports respectively connected to the optical splitters, said optical switching element being arranged to admit an optical signal appearing on a selected one of its input ports through to its output port; and
a second WDD having a plurality of output ports and having an input port connected to the output port of said optical switching element.

11. A switch as claimed in claim 10, wherein the connection verification unit comprises a controller for controlling application of the test signals by the intensity controllers and for selecting the input port of the optical switching element on which appears the optical signal admitted to the output port of the optical switching element.

12. A switch as claimed in claim 10, wherein the second stage comprises:
a plurality of optical receivers, each having an output port and having an input port connected to a corresponding one of the output ports of said second WDD; and
a plurality of test signal detectors, each having an output port and having an input port connected to a corresponding one of said optical receivers.

13. A switch as claimed in claim 2, wherein the first stage comprises:
a first optical switching element having an output port and having a plurality of input ports respectively connected to the optical splitters, said optical switching element being adapted to pass an optical signal appearing on a selected one of its input ports through to its output port; and a second WDD having a plurality of output ports and having an input port connected to the output port of said first optical switching element; and
at least one second optical switching element connected to the output ports of said second WDD, each said at least one second optical switching element having an output port, said at least one second optical switching element having an aggregate number of input ports sufficient to accommodate the output ports of said second WDD, each said second optical switching element being adapted to pass an optical signal appearing on a selected one of its input ports through to its output port.

14. A switch as claimed in claim 13, wherein the connection verification unit comprises a controller for controlling application of the test signals by the intensity controllers and for selecting the input port of the optical switching element on which appears the optical signal admitted to the output port of each first and second optical switching element.

15. A switch as claimed in claim 13, wherein the second stage comprises:
at least one optical receiver, each having an output port and having an input port connected to a corresponding one of said at least one second optical switching element; and
at least one test signal detector, each having an output port and having an input port connected to a corresponding one of said at least one optical receiver.

16. A switch as claimed in claim 2, wherein the first stage comprises:
an optical switching element having an output port and having a plurality of input ports respectively connected to the optical splitters, said optical switching element being arranged to admit an optical signal appearing on a selected one of its input ports through to its output port; and
a tunable optical filter connected to the output port of said optical switching element, said tunable optical filter being adapted to admit an optical signal in a selected optical frequency range through to said second stage.

17. A switch as claimed in claim 16, wherein the connection verification unit comprises a controller for controlling application of the test signals by the intensity controllers and for selecting the optical frequency range admitted by said tunable optical filter.

18. A switch as claimed in claim 16, wherein the second stage comprises:
an optical receiver having an output and having an input connected to said tunable optical filter; and
a test signal detector connected to said optical receiver.

19. A switch as claimed in claim 2, said core comprising a plurality of optical switching elements, each said optical switching element having a plurality of input ports and a plurality of output ports and operable to establish photonic connections therebetween, wherein a subset of the input ports of said optical switching elements represents said subset of the input ports of the core and wherein a subset of the output ports of said optical switching elements represents said subset of the output ports of the core.

20. A switch as claimed in claim 19, further comprising a wavelength converting switch, said wavelength converting switch having a plurality of input ports and a plurality of output ports and operable to establish non-photonic connections therebetween, wherein the input ports of the wavelength converting switch are connected to output ports of the core which are not members of said subset of the output ports of the core and wherein the output ports of the wavelength converting switch are connected to input ports of the core which are not members of said subset of the input ports of the core.

21. A switch as claimed in claim 20, further comprising a plurality of second optical splitters connected to the output ports of the core which are not members of said subset of the output ports of the core.

22. A switch as claimed in claim 21, wherein the first stage comprises:
   a plurality of second WDMs, each having an output port and having a plurality of input ports connected to the second optical splitters;
   an optical switching element having an output port and having a plurality of input ports each connected to a corresponding one of the first optical splitters or to a corresponding one of the output ports of one of the second WDMs, said optical switching element being arranged to admit an optical signal appearing on a selected one of its input ports through to its output port; and
   a second WDD having a plurality of output ports and having an input port connected to the output port of said optical switching element.

23. A switch as claimed in claim 22, wherein the first stage further comprises:
   at least one second optical switching element connected to the output ports of said second WDD, each said at least one second optical switching element having an output port, said at least one second optical switching element having an aggregate number of input ports sufficient to accommodate the output ports of said second WDD, each said second optical switching element being adapted to pass an optical signal appearing on a selected one of its input ports through to its output port.

24. A switch as claimed in claim 23, wherein the second stage comprises:
   a plurality of first optical receivers, each having an output port and having an input port connected either to a corresponding one of the second optical splitters or to a corresponding one of the output ports of one of the second WDDs;
   a plurality of first test signal detectors, each first test signal detector having an output port and having an input port connected to a respective one of the optical receivers;
   at least one second optical receiver, each having an output port and having an input port connected to the output port of a corresponding one of said at least one second optical switching element in the first stage; and
   a second test signal detector having an output port and having an input port connected to the output of the second optical receiver.

25. A switch as claimed in claim 21, wherein the first stage comprises:
   a plurality of second WDMs, each having an output port and having a plurality of input ports connected to the second optical splitters;
   an optical switching element having an output port and having a plurality of input ports each connected to a corresponding one of the first optical splitters or to a corresponding one of the output ports of one of the second WDMs, said optical switching element being arranged to admit an optical signal appearing on a selected one of its input ports through to its output port; and
   a tunable optical filter connected to the output port of said optical switching element, said tunable optical filter being adapted to admit an optical signal in a selected optical frequency range through to said second stage.

26. A switch as claimed in claim 25, wherein the second stage comprises:
   an optical receiver having an output port and having an input port connected to the output port of the tunable optical filter; and
   a test signal detector having an output port and having an input port connected to a the optical receiver.

27. A switch as claimed in claim 2, further comprising a power spectrum equalization unit connected to said first stage and utilizing said single-carrier component signals corresponding to said at least one of the signals exiting said subset of the output ports of said core.

28. A switch as claimed in claim 1, wherein test signals applied to different ones of the input multi-carrier optical signals have mutually distinct amplitudes or frequency content or encode mutually distinct digital messages.

29. A switch as claimed in claim 1, further comprising a test signal cancellation unit for removing at least one test signal from at least one of optical signals exiting said subset of the output ports of the core.

30. A switch as claimed in claim 29, wherein said at least one test signal is a frequency tone and wherein said test signal cancellation unit comprises an anti-phase modulator.

31. A switch as claimed in claim 30, wherein said anti-phase modulator is adapted to derive anti-phase modulation by tapping said at least one test signal from said connection verification unit and passing the at least one tapped signal through an inverting amplifier.

32. A switch as claimed in claim 2, wherein the test signals applied to at least two different input multi-carrier optical signals are mutually non-interfering.

33. A system for use with a switch for optical signals, the switch having a plurality of wavelength division demultiplexers (WDDs), each having an input port and a plurality of output ports; a plurality of wavelength division multiplexers (WDMs), each having an output port and a plurality of input ports; and an optical switching core having a plurality of input ports at which optical signals enter the core and a plurality of output ports at which optical signals exit the core, wherein a subset of the input ports of the core is connected to the output ports of the WDDs and wherein a subset of the output ports of the core is connected to the input ports of the WDMs, the core being capable of establishing photonic connections between the subset of its input ports and the subset of its output ports in response to an indication of desired connections, the system comprising:
   a plurality of optical intensity controllers, each connectable to the input port of a corresponding one of the WDDs and adapted to vary the intensity of an input multi-carrier optical signal entering the input port of the corresponding one of the WDDs;
   a plurality of optical splitters, each connectable to the output port of a corresponding one of the WDMs and adapted to tap a fraction of the optical intensity of an output multi-carrier optical signal exiting the output port of the corresponding one of the WDMs; and
   a connection verification unit connected to said optical intensity controllers and to said optical splitters and being operable to:
      (a) control said optical intensity controllers so as to cause a test signal to be applied to at least one of the input multi-carrier optical signals;

(b) determine, on the basis of at least one of the desired connections and for at least one of the signals exiting said subset of the output ports of said core, which test signal is expected to appear in said at least one of the signals exiting said subset of the output ports of said core;

(c) process the output multi-carrier optical signals tapped by said optical splitters in order to detect which test signal, if any, appears in said at least one of the signals exiting said subset of the output ports of said core; and (d) compare the detected and expected test signals, thereby determining whether said at least one of the desired connections has been correctly established by said core.

* * * * *

UNITED STATES PATENT AND TRADEMARK OFFICE
CERTIFICATE OF CORRECTION

PATENT NO. : 6,871,021 B2
APPLICATION NO. : 09/859544
DATED : March 22, 2005
INVENTOR(S) : Alan F. Graves et al.

It is certified that error appears in the above-identified patent and that said Letters Patent is hereby corrected as shown below:

Assignee's Name: "NORTEL NETWORKS LIMITED" instead of " NORTL NETWORKS LIMITED"

Signed and Sealed this

Twenty-ninth Day of August, 2006

JON W. DUDAS
*Director of the United States Patent and Trademark Office*